US009272437B2

(12) United States Patent
Hashish et al.

(10) Patent No.: US 9,272,437 B2
(45) Date of Patent: Mar. 1, 2016

(54) FLUID DISTRIBUTION COMPONENTS OF HIGH-PRESSURE FLUID JET SYSTEMS

(71) Applicant: Flow International Corporation, Kent, WA (US)

(72) Inventors: Mohamed Hashish, Bellevue, WA (US); Robert Niblock, Maple Valley, WA (US); Steven J. Craigen, Auburn, WA (US); Bruce M. Schuman, Kent, WA (US); Shawn Michael Callahan, Seattle, WA (US); Paul Tacheron, Auburn, WA (US); Sean Schramm, Bonney Lake, WA (US)

(73) Assignee: Flow International Corporation, Kent, WA (US)

( * ) Notice: Subject to any disclaimer, the term of this patent is extended or adjusted under 35 U.S.C. 154(b) by 147 days.

(21) Appl. No.: 13/665,774

(22) Filed: Oct. 31, 2012

(65) Prior Publication Data

US 2014/0116217 A1 May 1, 2014

(51) Int. Cl.
*B26F 1/26* (2006.01)
*B24C 5/02* (2006.01)

(52) U.S. Cl.
CPC ... *B26F 1/26* (2013.01); *B24C 5/02* (2013.01); *Y10T 83/364* (2015.04)

(58) Field of Classification Search
CPC ....... F16L 19/048; F16L 19/062; F16L 43/00; F16L 43/001; B26F 1/26; B24C 5/02; Y10T 83/364
USPC .................. 83/177, 53, 98, 99; 239/433, 434; 29/890.14; 451/99–102
See application file for complete search history.

(56) References Cited

U.S. PATENT DOCUMENTS

| 3,531,214 | A |   | 9/1970 | Abramson |           |
|-----------|---|---|--------|----------|-----------|
| 3,678,689 | A |   | 7/1972 | Ishiwata |           |
| 3,733,676 | A | * | 5/1973 | Morgan   | 29/890.14 |
| 4,541,423 | A |   | 9/1985 | Barber   |           |
| 4,723,387 | A | * | 2/1988 | Krasnoff | 451/75    |
| 4,765,540 | A |   | 8/1988 | Yie      |           |
| 5,065,789 | A |   | 11/1991| Eslinger |           |
| 5,154,347 | A | * | 10/1992| Vijay    | 239/4     |

(Continued)

FOREIGN PATENT DOCUMENTS

| CN | 2229553 Y | 6/1996 |
|----|-----------|--------|
| CN | 2246028 Y | 1/1997 |

(Continued)

*Primary Examiner* — Omar Flores Sanchez
(74) *Attorney, Agent, or Firm* — Seed IP Law Group PLLC

(57) ABSTRACT

High-pressure fluid jet systems are provided which include a pump to selectively provide a source of high-pressure fluid, a cutting head assembly configured to receive the high-pressure fluid and generate a high-pressure fluid jet for processing workpieces or work surfaces, and a fluid distribution system in fluid communication with the pump and the cutting head assembly to route the high-pressure fluid from the pump to the cutting head assembly. The pump, the cutting head assembly and/or the fluid distribution system include at least one fluid distribution component having a unitary body formed from an additive manufacturing or casting process with an internal passage having at least a curvilinear portion to efficiently route matter through the fluid jet system. Example fluid distribution components include fittings, valve bodies, cutting head bodies and nozzles of the high-pressure fluid jet systems.

19 Claims, 10 Drawing Sheets

(56) References Cited

U.S. PATENT DOCUMENTS

| | | | |
|---|---|---|---|
| 5,361,286 A | 11/1994 | Monserud et al. | |
| 5,418,824 A | 5/1995 | Monserud et al. | |
| 5,643,058 A | 7/1997 | Erichsen et al. | |
| 5,794,858 A * | 8/1998 | Munoz | 239/433 |
| 6,220,529 B1 | 4/2001 | Xu | |
| 6,766,216 B2 | 7/2004 | Erichsen et al. | |
| 6,852,002 B2 * | 2/2005 | Stewart et al. | 451/2 |
| 7,008,481 B2 | 3/2006 | Giolando et al. | |
| 7,402,096 B2 * | 7/2008 | Lisec | 451/69 |
| 7,594,614 B2 * | 9/2009 | Vijay et al. | 239/101 |
| 8,550,873 B2 * | 10/2013 | Vijay et al. | 451/3 |
| 2005/0050706 A1 | 3/2005 | Motzno | |
| 2006/0204384 A1 | 9/2006 | Cornell et al. | |
| 2008/0057839 A1 | 3/2008 | Anderson et al. | |
| 2009/0071303 A1 | 3/2009 | Hashish et al. | |
| 2009/0140482 A1 | 6/2009 | Saberton et al. | |
| 2009/0183790 A1 | 7/2009 | Moore | |
| 2009/0255602 A1 | 10/2009 | McMasters et al. | |
| 2010/0224543 A1 | 9/2010 | Ellis et al. | |
| 2011/0113940 A1 * | 5/2011 | Florean | 83/53 |
| 2012/0247296 A1 * | 10/2012 | Stang et al. | 83/177 |
| 2013/0025422 A1 * | 1/2013 | Chillman et al. | 83/53 |
| 2014/0165807 A1 * | 6/2014 | David et al. | 83/177 |

FOREIGN PATENT DOCUMENTS

| | | |
|---|---|---|
| CN | 2406979 Y | 11/2000 |
| CN | 2850822 Y | 12/2006 |
| CN | 2895428 Y | 2/2007 |
| CN | 201177121 Y | 1/2009 |
| DE | 299 20 344 U1 | 3/2000 |
| DE | 198 49 814 A1 | 5/2000 |
| DE | 100 51 942 A1 | 5/2002 |
| EP | 1 820 604 A1 | 8/2007 |
| EP | 2 230 397 A1 | 9/2010 |
| FR | 2 480 171 A1 | 10/1981 |
| FR | 2 754 331 A1 | 4/1998 |

* cited by examiner

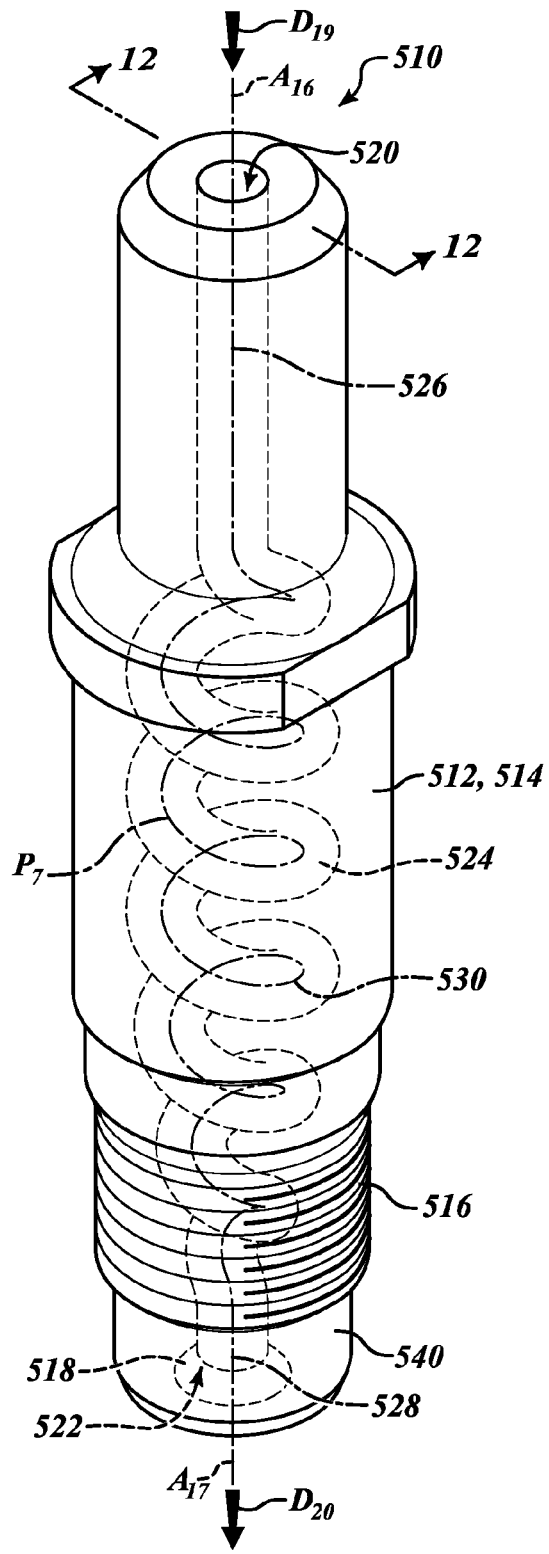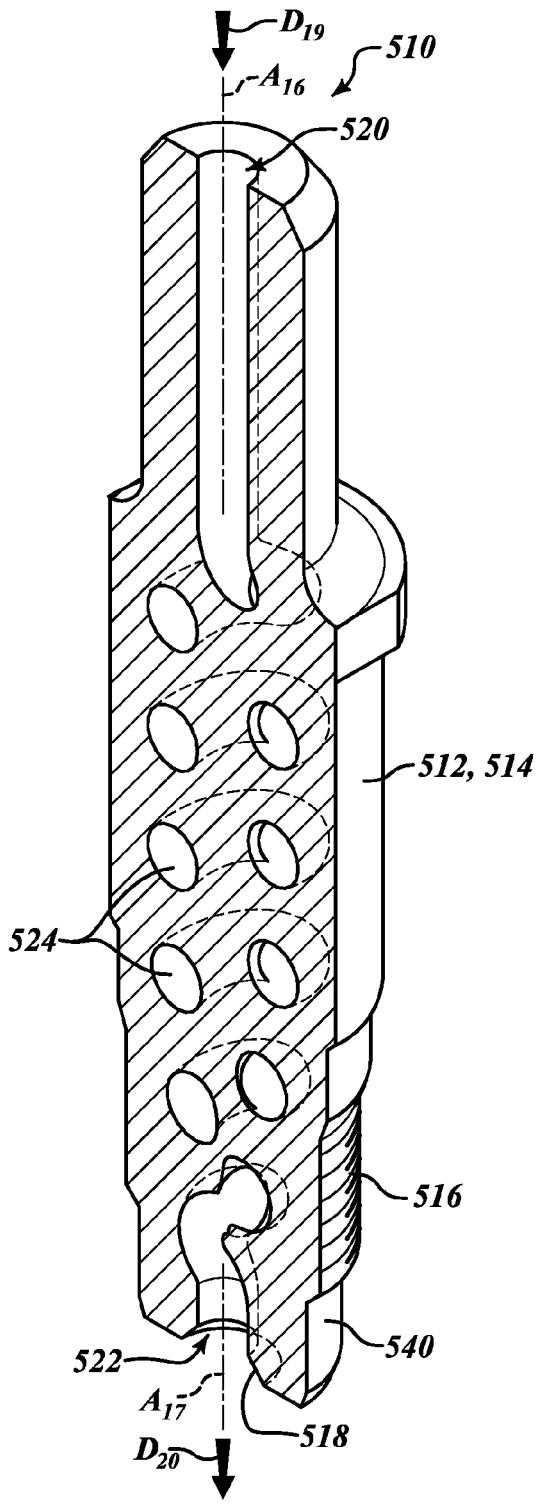

FLUID DISTRIBUTION COMPONENTS OF HIGH-PRESSURE FLUID JET SYSTEMS

BACKGROUND

1. Technical Field

This disclosure is related to high-pressure fluid jet systems and components thereof, and, in particular, to fluid distribution components of high-pressure fluid jet systems having complex internal passages to efficiently route matter therethrough.

2. Description of the Related Art

Waterjet or abrasive waterjet systems are used for cutting a wide variety of materials, including stone, glass, ceramics and metals. In a typical waterjet system, high-pressure water flows through a cutting head having a nozzle which directs a cutting jet onto a workpiece. The system may draw or feed abrasive media into the high-pressure waterjet to form a high-pressure abrasive waterjet. The cutting head may then be controllably moved across the workpiece to cut the workpiece as desired. After the waterjet, or abrasive waterjet, passes through the workpiece, the energy of the waterjet is often dissipated by a relatively large volume of water in a catcher tank, which may also be configured to support the workpiece. Systems for generating high-pressure waterjets are currently available, such as, for example, the Mach 4™ five-axis waterjet system manufactured by Flow International Corporation, the assignee of the present application. Other examples of waterjet systems are shown and described in Flow's U.S. Pat. No. 5,643,058, which is incorporated herein by reference in its entirety.

Various fluid distribution components, such as, for example, high-pressure tubing and high-pressure fittings, are known for routing fluid, such as, for example, high-pressure water and abrasives, toward a cutting head for cutting workpieces or processing work surfaces. Generally, such known fluid distribution components have internal passages that are limited in shape and/or trajectory for various reasons, including, for example, the high operating pressures to which the components are subjected during operation. Examples include manifolds or blocks with simple cross-drilled passages of constant diameter or thick-walled tubing which is bent or shaped to redirect flow in a desired direction. Conical or tapered ports are also common as are more complex passages which result from the combination of multiple parts fastened together. These known fluid distribution components, however, suffer from various deficiencies and drawbacks, including internal geometry that may disrupt, inhibit or otherwise hinder the flow of matter through the components.

BRIEF SUMMARY

Embodiments described herein provide fluid distribution components for high-pressure waterjet systems which are particularly well adapted for receiving a flow of high-pressure fluid or other matter (e.g., abrasive media) and routing said flow towards a cutting head assembly to cut or process a workpiece or work surface. Embodiments include fluid distribution components having unitary bodies formed from an additive manufacturing or casting process, the unitary body comprising an inlet, an outlet and an internal passage between the inlet and the outlet to assist in routing matter through the high-pressure fluid jet system. The internal passages have a path that is at least partially curvilinear and a cross-sectional profile that may vary over a length thereof. The passages may be shaped to redirect a flow from an inlet direction to an outlet direction while reducing or minimizing the pressure drop across the fluid distribution component. In addition, two or more internal passages may intersect in a manner which substantially reduces or eliminates hard edges or breaks that might otherwise be disruptive to the flow of matter passing therethrough. The fluid distribution components are subjected to cyclic or periodic loading during operation arising from recurrent high-pressure conditions, such as, for example, operating pressures of at least 20,000 psi.

In one embodiment, a high-pressure fluid jet system may be summarized as including a pump to selectively provide a source of high-pressure fluid at an operating pressure of at least 20,000 psi; an end effector assembly configured to receive the high-pressure fluid and generate a high-pressure fluid jet for processing a workpiece or work surface; and a fluid distribution system in fluid communication with the pump and the cutting head assembly to route the high-pressure fluid from the pump to the end effector assembly. At least one of the pump, the cutting head assembly and the fluid distribution system includes a fluid distribution component having a unitary body formed from an additive manufacturing or casting process, the unitary body comprising an inlet, an outlet and an internal passage between the inlet and the outlet to assist in routing matter through the high-pressure fluid jet system. The internal passage has a path that is at least partially curvilinear and the fluid distribution component is subjected to cyclic or periodic loading during operation of the system arising from recurrent high-pressure conditions corresponding to the operating pressure of at least 20,000 psi.

The inlet and the outlet of the fluid distribution components may each define a central axis, and the internal passage may extend through the unitary body along a path, a first end portion of the path being generally aligned with the central axis of the inlet and a second end portion of the path being generally aligned with the central axis of the outlet. The path of the internal passage that extends through the unitary body may further include an intermediate portion between the first end portion and the second end portion that is curvilinear, and the internal passage may be configured to gradually redirect a flow of matter from an inlet direction along the central axis of the inlet to an outlet direction along the central axis of the outlet. The path of the internal passage that extends through the unitary body may lay within a plane defined by the central axes of the inlet and the outlet. The path of the internal passage that extends through the unitary body may be a three dimensional path. At least a portion of the internal passage that extends through the unitary body may have a cross-sectional profile that varies over a corresponding length of the path, such as, for example, in size and/or shape. For example, the cross-sectional profile may gradually narrow over a corresponding length of the path in a downstream direction. A portion of the path of the internal passage of the fluid distribution component may have a radius of curvature that is substantially constant.

In some embodiments, the fluid distribution component may be a fitting of the fluid distribution system and the fitting may include a coupling device at each of the inlet and the outlet to couple to other components of the fluid distribution system. the inlet and the outlet of the fitting may each define a central axis with the internal passage extending through the unitary body along a path, a first end portion of the path being generally collinear with the central axis of the inlet and a second end portion of the path being generally collinear with the central axis of the outlet. An intermediate portion of the path of the internal passage may include a first portion with a first radius of curvature and a second portion with a second radius of curvature, and an origin of the first radius of curvature and an origin of the second radius of curvature may be located on opposite sides of the path. The first radius of curvature of the first portion and/or the second radius of curvature of the second portion may be substantially constant. The fitting may be an elbow fitting, and each of the inlet and the outlet may include a frustoconical engagement surface to mate with a respective adjacent component of the fluid distribution system.

In some embodiments, the fluid distribution component may be a valve body of the pump, the valve body having a sidewall, an upstream end and a downstream end. The inlet may be formed in the sidewall to receive a source of fluid and the outlet may be formed in the upstream end of the valve body to intermittingly discharge fluid passing through the inlet into a cylinder cavity downstream of the outlet for subsequent pressurization of the fluid during a pressurizing stroke of the pump. The valve body may include a plurality of inlets spaced around a perimeter of the valve body, a corresponding plurality of outlets formed in the upstream end of the valve body and a respective internal passage extending between each inlet and corresponding outlet. The valve body may further include a central discharge passage to enable high-pressure fluid generated during the pressurization stroke of the pump to pass through the valve body toward a high-pressure fluid output of the pump. The central discharge passage may extend from the upstream end of the valve body to the downstream end of the valve body along a central axis of the valve body, and each internal passage may include an upstream portion that extends generally perpendicular to the central axis of the valve body and a downstream portion which extends generally parallel to the central axis of the valve body. The upstream portion of each internal passage may have an initial cross-sectional area that is greater than a terminal cross-sectional area of the downstream portion of the internal passage.

In some embodiments, the fluid distribution component may be an abrasive waterjet cutting head body including an orifice receiving section to receive an orifice to generate a high-pressure fluid jet during operation. The cutting head body may include an abrasive media feed portion which includes the inlet and the outlet, the internal passage being formed in the abrasive media feed portion between the inlet and the outlet to route abrasive media from the inlet toward a mixing chamber formed in the abrasive waterjet cutting head body downstream of the orifice receiving section. The abrasive waterjet cutting head body may further include a secondary annular fluid chamber surrounding a central jet passageway that extends downstream from the mixing chamber of the abrasive waterjet cutting head body and may further include a plurality of discharge passages leading from the secondary annular fluid chamber to an environment external to the abrasive waterjet cutting head body, each of the discharge passages having at least a portion that extends along a curvilinear path. The abrasive waterjet cutting head body may include a vacuum assist portion comprising a vacuum assist passage extending between the mixing chamber and a vacuum assist port, the vacuum assist passage defining a path that is at least partially curvilinear. In some instances, the abrasive media passage may be configured to gradually redirect a flow of abrasive media from an initial inlet direction to a different direction that points toward the mixing chamber.

In some embodiments, the fluid distribution component may be a nozzle body and the internal passage may be formed in the nozzle body with the inlet located in an upstream end thereof to receive a flow of high-pressure fluid and the outlet formed in a downstream end thereof to discharge the flow of high-pressure fluid. The internal passage of the nozzle body may include at least a portion which follows a spiral path having at least three revolutions about a central axis of the nozzle body.

In some embodiments, the fluid distribution component may be a surface preparation nozzle having a plurality of discharge conduits which diverge in a downstream direction from a common origin along a central axis of the nozzle. The outlet of the nozzle may include a plurality of outlets centrally located at a downstream end of the nozzle and a weep passage may be provided between each of the plurality of outlets and a downstream end of a respective discharge conduit to vent fluid from the discharge conduits during operation.

In yet other embodiments, individual fluid distribution components, such as those described above, may be provided apart from the high-pressure fluid jet system.

BRIEF DESCRIPTION OF THE SEVERAL VIEWS OF THE DRAWINGS

FIG. 11 is an isometric view of a fluid distribution component of a high-pressure waterjet system, according to one embodiment, in the form of a nozzle body.

FIG. 12 is an isometric cross-sectional view of the nozzle body of FIG. 11 taken alone line 12-12 of FIG. 11.

DETAILED DESCRIPTION

Figure 1:
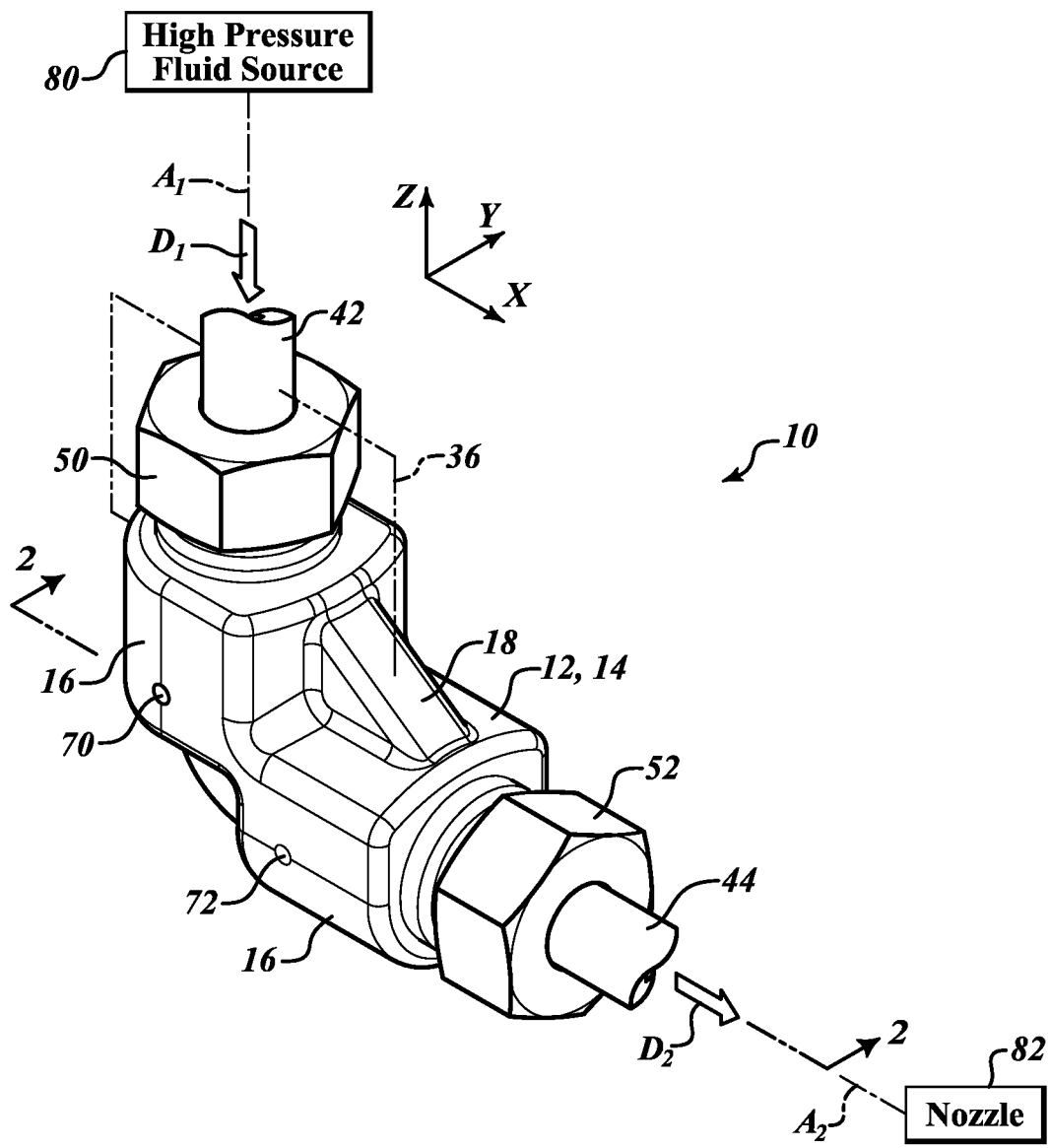
FIG. 1 is an isometric view of a fluid distribution component of a high-pressure waterjet system, according to one embodiment, in the form of a fitting coupled to adjacent components of the system.

In the following description, certain specific details are set forth in order to provide a thorough understanding of various disclosed embodiments. However, one of ordinary skill in the relevant art will recognize that embodiments may be practiced without one or more of these specific details. In other instances, well-known structures associated with waterjet cutting systems and methods of operating the same may not be shown or described in detail to avoid unnecessarily obscuring descriptions of the embodiments. For instance, it will be appreciated by those of ordinary skill in the relevant art that a high-pressure fluid source and an abrasive source may be provided to feed high-pressure fluid and abrasives, respectively, to a cutting head of the waterjet systems described herein to facilitate, for example, high-pressure abrasive waterjet cutting or processing of workpieces and work surfaces. As another example, well know control systems and drive components may be integrated into the waterjet systems to facilitate movement of the cutting head relative to the workpiece or work surface to be processed. These systems may include drive components to manipulate the cutting head about multiple rotational and translational axes, as is common in five-axis abrasive waterjet cutting systems. Example waterjet systems may include waterjet cutting heads coupled to a gantry-type motion system, a robotic arm motion system or other conventional motion system.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide fluid distribution components for high-pressure fluid jet systems which are particularly well adapted for receiving a flow of high-pressure fluid or other matter (e.g., abrasive media) and routing said flow towards a cutting head assembly to cut or process a workpiece or work surface. Embodiments include fluid distribution components having unitary bodies formed from an additive manufacturing or casting process, the unitary body comprising an inlet, an outlet and an internal passage between the inlet and the outlet to assist in routing matter through system. The internal passages have a path that is at least partially curvilinear and a cross-sectional profile that may vary over a length thereof. The passages may be shaped to redirect a flow from an inlet direction to an outlet direction while reducing or minimizing the pressure drop across the fluid distribution component. In addition, two or more internal passages may intersect in a manner which substantially reduces or eliminates hard edges or breaks that might otherwise be disruptive to the flow of matter passing therethrough.

As described herein, the term cutting head or cutting head assembly may refer generally to an assembly of components at a working end of the waterjet machine or system, and may include, for example, an orifice, such as a jewel orifice, through which fluid passes during operation to generate a high-pressure waterjet, a nozzle for discharging the high-pressure waterjet and surrounding structures and devices coupled directly or indirectly thereto to move in unison therewith. The cutting head may also be referred to as an end effector or nozzle assembly.

The waterjet system may operate in the vicinity of a support structure which is configured to support a workpiece to be processed by the system. The support structure may be a rigid structure or a reconfigurable structure suitable for supporting one or more workpieces (e.g., composite aircraft parts) in a position to be cut, trimmed or otherwise processed. Examples of suitable workpiece support structures include those shown and described in Flow's U.S. application Ser. No. 12/324,719, filed Nov. 26, 2008, and published as US 2009/0140482, which is incorporated herein by reference in its entirety.

The waterjet system may further include a bridge assembly which is movable along a pair of base rails. In operation, the bridge assembly can move back and forth along the base rails with respect to a translational axis to position a cutting head of the system for processing the workpiece. A tool carriage may be movably coupled to the bridge assembly to translate back and forth along another translational axis, which is aligned perpendicularly to the aforementioned translational axis. The tool carriage may be configured to raise and lower the cutting head along yet another translational axis to move the cutting head toward and away from the workpiece. One or more manipulable links or members may also be provided intermediate the cutting head and the tool carriage to provide additional functionality.

For example, the waterjet system may include a forearm rotatably coupled to the tool carriage for rotating the cutting head about an axis of rotation and a wrist rotatably coupled to the forearm to rotate the cutting head about another axis of rotation that is non-parallel to the aforementioned rotational axis. In combination, the rotational axes of the wrist and forearm can enable the cutting head to be manipulated in a wide range of orientations relative to the workpiece to facilitate, for example, cutting of complex profiles. The rotational axes may converge at a focal point which, in some embodiments, may be offset from the end or tip of a nozzle of the cutting head. The end or tip of the nozzle of the cutting head is preferably positioned at a desired standoff distance from the workpiece or work surface to be processed. The standoff distance may be selected or maintained at a desired distance to optimize the cutting performance of the waterjet.

During operation, movement of the cutting head with respect to each of the translational axes and one or more rotational axes may be accomplished by various conventional drive components and an appropriate control system. The control system may generally include, without limitation, one or more computing devices, such as processors, microprocessors, digital signal processors (DSP), application-specific integrated circuits (ASIC), and the like. To store information, the control system may also include one or more storage devices, such as volatile memory, non-volatile memory, read-only memory (ROM), random access memory (RAM), and the like. The storage devices can be coupled to the computing devices by one or more buses. The control system may further include one or more input devices (e.g., displays, keyboards, touchpads, controller modules, or any other peripheral devices for user input) and output devices (e.g., displays screens, light indicators, and the like). The control system can store one or more programs for processing any number of different workpieces according to various cutting head movement instructions. The control system may also control operation of other components, such as, for example, an abrasive media feed system or vacuum device coupled to the abrasive waterjet cutting head bodies described herein. The control system, according to one embodiment, may be provided in the form of a general purpose computer system. The computer system may include components such as a CPU, various I/O components, storage, and memory. The I/O components may include a display, a network connection, a computer-readable media drive, and other I/O devices (a keyboard, a mouse, speakers, etc.). A control system manager program may be executing in memory, such as under control of the CPU, and may include functionality related to routing high-pressure water and abrasive media through the waterjet systems described herein.

Further example control methods and systems for abrasive waterjet systems, which include, for example, CNC functionality, and which are applicable to the waterjet systems described herein, are described in Flow's U.S. Pat. No. 6,766,216, which is incorporated herein by reference in its entirety. In general, computer-aided manufacturing (CAM) processes may be used to efficiently drive or control a cutting head along a designated path, such as by enabling two-dimensional or three-dimensional models of workpieces generated using computer-aided design (i.e., CAD models) to be used to generate code to drive the machines. For example, in some instances, a CAD model may be used to generate instructions to drive the appropriate controls and motors of a waterjet system to manipulate the cutting head about various translational and/or rotational axes to cut or process a workpiece as reflected in the CAD model. Details of the control system, conventional drive components and other well known systems associated with waterjet and abrasive waterjet systems, however, are not shown or described in detail to avoid unnecessarily obscuring descriptions of the embodiments.

Other well known systems associated with waterjet systems may also be provided such as, for example, a high-pressure fluid source (e.g., direct drive and intensifier pumps with pressure ratings ranging from about 20,000 psi to 100,000 psi and higher) for supplying high-pressure fluid to the cutting head and/or an abrasive source (e.g., abrasive hopper and abrasive distribution system) for supplying abrasive media to the cutting head to enable abrasive waterjet processing activities. In some embodiments, a vacuum device may be provided to assist in drawing abrasives into the high-pressure water from the fluid source to produce a consistent abrasive waterjet to enable particularly accurate and efficient workpiece or work surface processing.

According to some embodiments, for example, a high-pressure waterjet system is provided which includes a pump, such as, for example, a direct drive pump or intensifier pump, to selectively provide a source of high-pressure water at an operating pressure of at least 20,000 psi, and in some instances, at or above 60,000 psi or between about 60,000 psi and about 110,000 psi. The high-pressure waterjet system further includes a cutting head assembly that is configured to receive the high-pressure water supplied by the pump and to generate a high-pressure waterjet for processing workpieces or work surfaces. A fluid distribution system in fluid communication with the pump and the cutting head assembly is also provided to assist in routing high-pressure water from the pump to the cutting head assembly.

Figure 2:
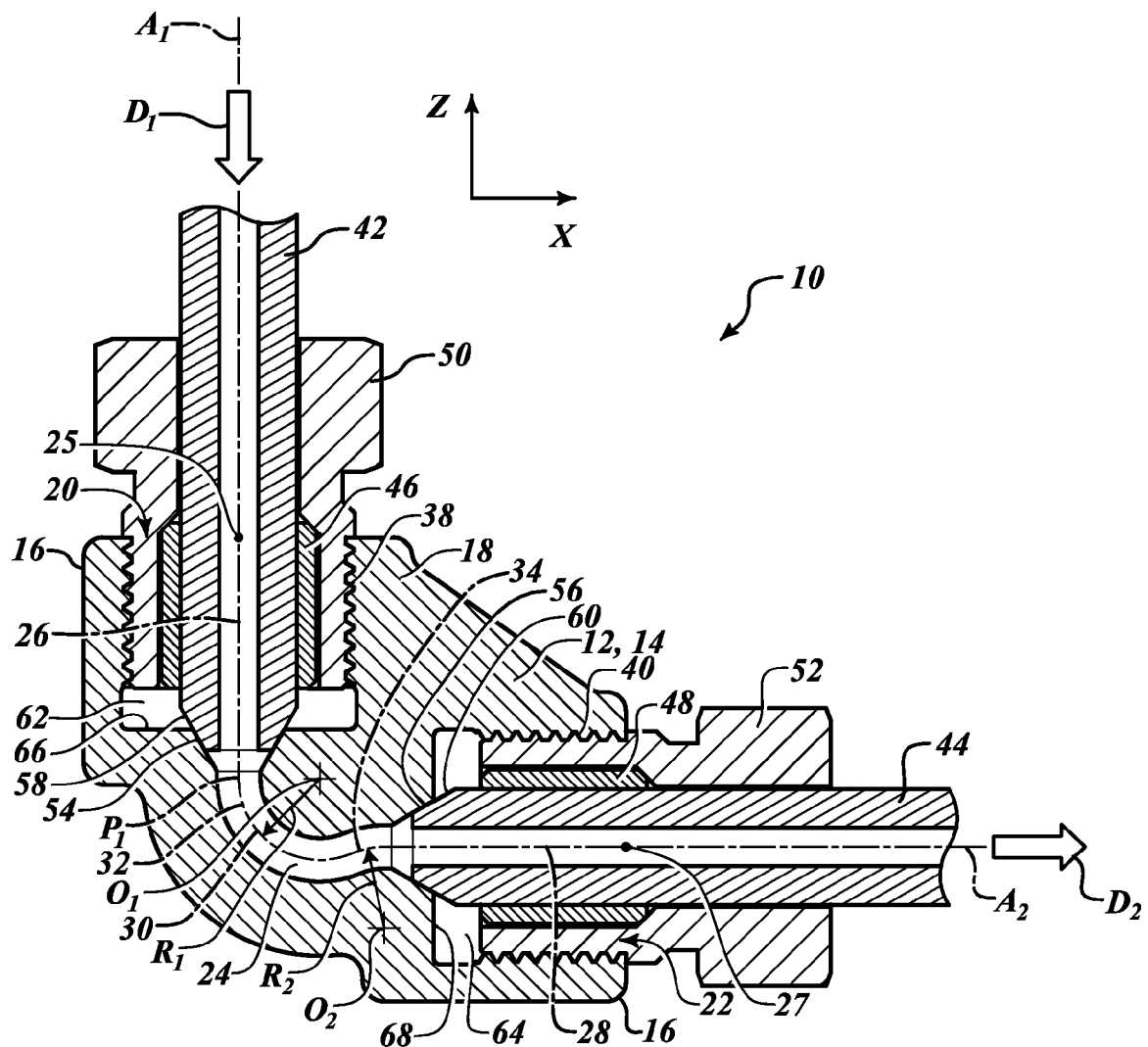
FIG. 2 is a cross-sectional view of the fitting and adjacent components of FIG. 1 taken along line 2-2 of FIG. 1.

FIGS. 1 and 2 show one example of a fluid distribution component 10 in the form of an elbow fitting 12 which is particularly well adapted to redirect high-pressure fluid (e.g., water) traveling in an inlet direction, indicated by the arrow labeled $D_1$, to an outlet direction, indicated by the arrow labeled $D_2$. The example fitting 12 has a unitary body 14 formed from an additive manufacturing or casting process using a material with material property characteristics (e.g., strength) suitable for high-pressure operating conditions. For instance, in some embodiments, the fitting 12 may be formed by a direct metal laser sintering process using 15-5 stainless steel material. In addition, the fitting 12 may undergo heat treatment or other manufacturing processes to alter the physical properties of the fitting 12, such as, for example, increasing the hardness of the fitting 12. Although the example fitting 12 is shown as an elbow fitting with perpendicular legs 16 and a gusset 18 integrally formed therebetween, it is appreciated that in other embodiments, the fitting 12 may take on different forms, including, for example, a tee-fitting or branch fitting.

With continued reference to FIGS. 1 and 2, the unitary body 14 of the fitting 12 is formed to include a fitting inlet 20, a fitting outlet 22 and an internal passage 24 extending between the fitting inlet 20 and the fitting outlet 22 to route fluid therethrough. The internal passage 24 is partially curvilinear and extends through the fitting 12 along a path $P_1$ between end point 25 and end point 27. More particularly, the fitting inlet 20 and the fitting outlet 22 each define a central axis $A_1$, $A_2$ and one end 26 of the path $P_1$ is generally collinear with the central axis $A_1$ of the fitting inlet 20 while the other end 28 of the path $P_1$ is generally collinear with the central axis $A_2$ of the fitting outlet 22. An intermediate portion 30 of the path $P_1$ between the end portions 26, 28 is curvilinear and shaped such that the internal passage 24 is configured to gradually redirect flow through the fitting 12 from the inlet direction $D_1$ along the central axis $A_1$ of the fitting inlet 20 to an outlet direction $D_2$ along the central axis $A_2$ of the fitting outlet 22. More specifically, the path $P_1$ of the internal passage 24 of the example fitting 12 includes an intermediate portion 30 having a first portion 32 with a first radius of curvature $R_1$ and a second portion 34 with a second radius of curvature $R_2$ with an origin $O_1$ of the first radius of curvature $R_1$ and an origin $O_2$ of the second radius of curvature $R_2$ located on opposite sides of the path $P_1$. Moreover, the path $P_1$ of the internal passage 24 that extends through the unitary body 14 lies within a plane 36 (FIG. 1) containing the central axes $A_1$, $A_2$ of the fitting inlet 20 and the fitting outlet 22. In other embodiments, however, the path $P_1$ of the internal passage 24 may be a three dimensional path with the fitting inlet 20 and fitting outlet 22 being offset from each other relative to three orthogonal axes X, Y, Z.

Although the internal passage 24 of the example embodiment of FIGS. 1 and 2 is shown as including an intermediate portion with a generally constant cross-sectional profile, it is appreciated that in other embodiments, at least a portion of the internal passage 24 that extends through the unitary body 14 may have a cross-sectional profile that varies over a corresponding length of the path $P_1$. For example, in some embodiments the cross-sectional profile may gradually narrow over a length of the path $P_1$ in a downstream or upstream direction. The cross-sectional profile of the passage 24 may vary in size, such as, for example, a circular cross-sectional profile that increases or decreases in diameter over a portion thereof and/or may vary in shape, such as, for example, a circular cross-sectional profile that transitions to an oval or other regular or irregularly shaped profile. In some embodiments, the size and/or shape of the cross-sectional profile may vary gradually over a portion of the internal passage 24. In addition, the internal passage 24 may intersect gradually with other passages (when provided) to avoid sharp corners or other features that may be disruptive to the flow of fluid through the fitting 12.

As shown in FIGS. 1 and 2, the fitting 12 may be coupled to adjacent components of the fluid distribution system to assist in routing fluid therethrough. For example, each of the fitting inlet 20 and the fitting outlet 22 may be formed with or otherwise provided with internal threads 38, 40 to enable the fitting 12 to receive other high-pressure fluid distribution components, such as, for example, high-pressure tubing 42, 44. The high-pressure tubing 42, 44 may cooperate with correspondingly sized sleeves 46, 48 and externally threaded glands 50, 52 to urge the high-pressure tubing 42, 44 into sealing contact with the fitting 12. The unitary body 14 of the fitting 12 may be formed to include a frustoconical engagement surface 54, 56 at each of the fitting inlet 20 and the fitting outlet 22 to mate with a respective tapered surface 58, 60 of the high-pressure tubing 42, 44. When the high-pressure tubing 42, 44 is seated against the engagement surfaces 54, 56 of the fitting 12, a respective cavity 62, 64 may be formed between the glands 50, 52 and a respective end face 66, 68 of the fitting inlet 20 and the fitting outlet 22. The cavities 62, 64 may be vented to the external environment via vent passages 70, 72 extending from the fitting inlet 20 and the fitting outlet 22 to the external environment through the unitary body 14, as shown in FIG. 1.

The high-pressure tubing 42, 44 may connect the fitting 12 to upstream and downstream components of the waterjet systems described herein. The fitting 12 may be installed downstream of a high-pressure fluid source 80, such as, for example, a high-pressure pump to receive a flow of high-pressure fluid (e.g., water) and redirect the flow downstream and ultimately to a nozzle 82 to be discharged therefrom for processing a workpiece or work surface. The nozzle 82 may be, for example, a nozzle 82 of a waterjet cutting head assembly. In this arrangement, the fitting 12 is subjected to cyclic or periodic loading during operation of the system arising from recurrent high-pressure conditions corresponding to the operating pressure of the high-pressure fluid source 80, which may be, for example, a pump configured to supply high-pressure fluid at an operating pressure of at least 20,000 psi. In other instances, the pump may be configured to supply high-pressure fluid at an operating pressure of at least 60,000 psi or between 60,000 psi and 110,000 psi.

Initial tests have shown that the example elbow fitting 12 formed as a unitary body 14 using a laser sintering process with a 15-5 stainless steel material (heat treated and non heat treated) can sustain over 25,000 cycles of fluctuating pressure between ambient pressure and 60,000 psi before failure. This appears to be on par with comparative tests of prior art elbow fittings that are machined from a block of high strength stainless steel to include straight cross-drilled holes that intersect within the block at a ninety degree angle. As such, it is believed that the aforementioned elbow fitting 12 (and other fluid distribution 10 components described herein) may be fabricated to meet or exceed the operational strength and life-cycles of existing fluid distribution components while also providing enhanced functionality with respect to the movement of matter through the same (e.g., improved flow conditions).

Figure 3:
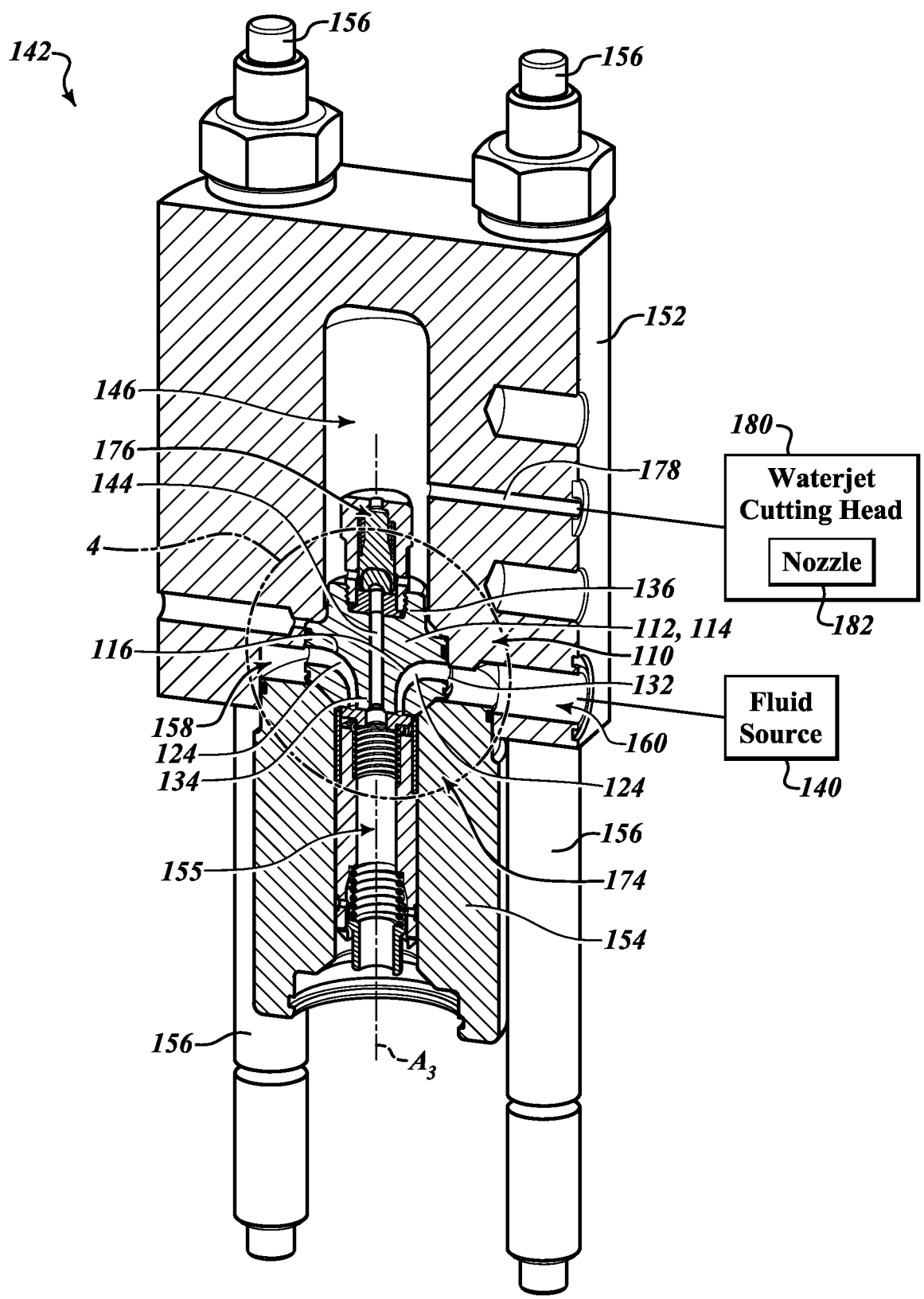
FIG. 3 is a perspective cross-sectional view of a portion of a high-pressure pump assembly showing a fluid distribution component, according to one embodiment, in the form of a valve body coupled between an end cap and a cylinder of the pump assembly.
Figure 4:
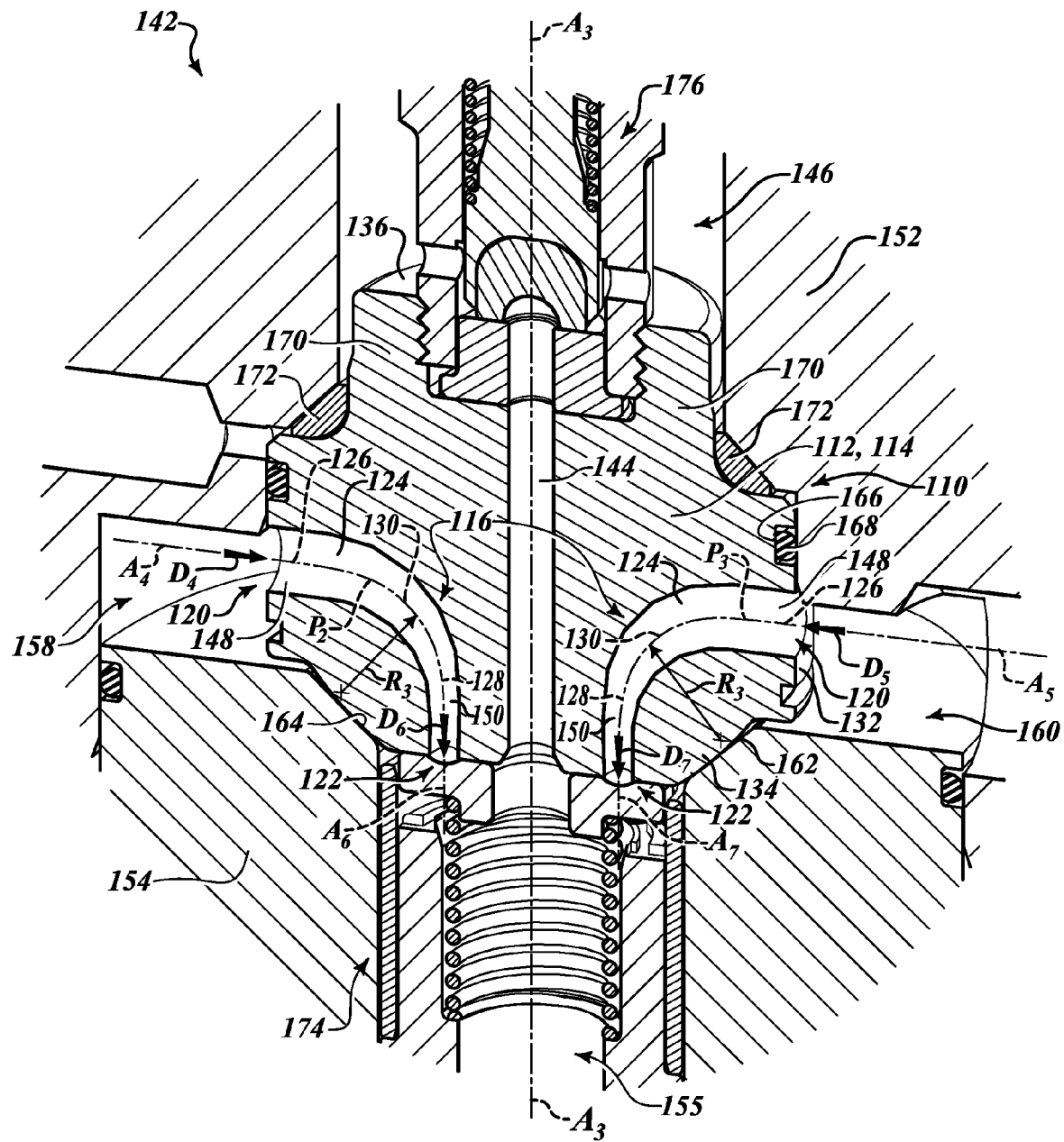
FIG. 4 is an enlarged cross-sectional detail view of the valve body of FIG. 3 shown coupled between the end cap and the cylinder of the pump assembly.

FIGS. 3 and 4 show one example of a fluid distribution component 110 in the form of a valve body 112 of a host pump assembly 142 which is particularly well adapted to redirect fluid (e.g., water) traveling in one or more inlet directions, indicated by the arrows labeled $D_4$, $D_5$, to one or more corresponding outlet directions, indicated by the arrows labeled $D_6$, $D_7$. The example valve body 112 has a unitary body 114 formed from an additive manufacturing or casting process using a material with material property characteristics (e.g., strength) suitable for high-pressure operating conditions. For instance, in some embodiments, the valve body 112 may be formed by a direct metal laser sintering process using 15-5 stainless steel material. In addition, the valve body 112 may undergo heat treatment or other manufacturing processes to alter the physical properties of the valve body 112, such as, for example, increasing the hardness of the valve body 112. Although the example valve body 112 is shown as a generally cylindrical body with reduced or tapered portions for interfacing with adjacent components, it is appreciated that in other embodiments the valve body 112 may take on different form factors. In addition, the valve body 112 may include coupling features, such as, for example, internal or external threads, for mating with corresponding coupling features of adjacent components, such as, for example, an inlet check valve 174 and/or an outlet check valve 176.

With continued reference to FIGS. 3 and 4, the host pump assembly 142 may include an inlet check valve 174 interacting with an upstream end 134 of the valve body 112 and an outlet check valve 176 interacting with a downstream end 136 of the valve body 112 to control the flow of fluid through the valve body 112 during operation. In particular, the inlet check valve 174 unseats from the upstream end 134 of the valve body 112 during an intake stroke of a reciprocating plunger (not shown) within a cylinder 154 of the pump 142 to allow fluid into a cylinder cavity 155 via internal passageways 116 of the valve body 112, described in greater detail below, while the outlet check valve 176 remains seated at the downstream end 136 of the valve body 112. Then, during a pressurizing stroke of the plunger, the inlet check valve 174 seats against the upstream end 134 of the valve body 112 to seal off the internal passageways 116, as well as a central discharge passage 144 of the valve body 112, from the cylinder cavity 155 while pressure builds within the cylinder cavity 155 until the outlet check valve 176 unseats from the downstream end 136 of the valve body 112 to release high-pressure fluid into the output chamber 146 within an end cap 152 of the pump assembly 142 via the discharge passage 144 to be discharged from the pump assembly 142 through a high-pressure fluid output passage 178. Ultimately, the high-pressure fluid generated by the pump assembly 142 may be distributed to a waterjet cutting head 180 including a nozzle 182, as illustrated in FIG. 3, for discharging a high-pressure jet onto a workpiece or work surface for cutting or otherwise processing the same.

With continued reference to FIGS. 3 and 4, the unitary body 114 of the valve body 112 is formed to include the plurality of flow passageways 116 therethrough, each flow passageway 116 including a valve body inlet 120, a valve body outlet 122 and an internal passage 124 extending between the valve body inlet 120 and the valve body outlet 122 to route fluid therethrough. Each internal passage 124 extends through the valve body 112 along a respective path $P_2$, $P_3$ that is at least partially curvilinear. Each of the valve body inlets 120 and the valve body outlets 122 define a respective central axis $A_4$, $A_5$, $A_6$, $A_7$ and one end 126 of each respective path $P_2$, $P_3$ is generally collinear with the central axis $A_4$, $A_5$ of the corresponding valve body inlet 120 while the other end 128 of each respective path $P_2$, $P_3$ is generally collinear with the central axis $A_6$, $A_7$ of the corresponding valve body outlet 122. An intermediate portion 130 of each respective path $P_2$, $P_3$ between the end portions 126, 128 is curvilinear and shaped such that the internal passage 124 is configured to gradually redirect flow through the valve body 112 from the respective inlet direction $D_4$, $D_5$ generally aligned with the respective central axis $A_1$ of each valve body inlet 120 to an outlet direction $D_6$, $D_7$ generally aligned with the central axis $A_2$ of each valve body outlet 122. More particularly, each respective path $P_2$, $P_3$ of the internal passages 124 of the example valve body 112 includes an intermediate portion 130 having a generally constant radius of curvature $R_3$. Moreover, each respective path $P_2$, $P_3$ of the internal passages 124 that extends through the unitary body 114 lies within a respective plane containing the central axes $A_4$, $A_6$ and $A_5$, $A_7$ of the respective valve body inlet 120 and the valve body outlet 122. In other embodiments, however, each path $P_2$, $P_3$ of the internal passages 124 may be a three dimensional path with the corresponding valve body inlet 120 and valve body outlet 122 offset from each other.

Although the internal passages 124 of the example embodiment is shown as including an intermediate portion 130 with a generally constant radius of curvature $R_3$, it is appreciated that in other embodiments the radius of curvature may vary along each respective path $P_2$, $P_3$. In addition, although the internal passages 124 of the example embodiment are shown as including an intermediate portion 130 with a cross-sectional profile that gradually tapers in a downstream direction, it is appreciated that in other embodiments, at least a portion of the internal passages 124 that extend through the unitary body 114 may have a generally constant cross-sectional profile. The cross-sectional profile of the passages 124 may also vary in shape over at least a portion of the passage 124. For example, the passage 124 may include a circular cross-sectional profile at an upstream end that transitions to an oval or other regular or irregularly shaped profile at a downstream end. In some embodiments, the size and/or shape of the cross-sectional profile may vary gradually over a portion of the internal passages 124. In addition, the internal passages 124 may intersect gradually with each other or other passages in a manner that avoids sharp corners or other features that may be disruptive to flow through the valve body 112.

In some embodiments, the valve body 112 includes a sidewall 132, an upstream end 134 and a downstream end 136 opposite the upstream end 134. The valve body 112 may further include a plurality of valve body inlets 120 that are spaced regularly or irregularly around a perimeter of the sidewall 132, a corresponding plurality of valve body outlets 122 formed in the upstream 134 end of the valve body 112 and a respective internal passage 124 extending between each of the valve body inlets 120 and corresponding valve body outlets 122. The valve body inlets 120 may be formed in the sidewall 132 to receive fluid from a fluid source 140 and the valve body outlets 122 may be formed in the upstream end 134 of the valve body 112 to intermittingly discharge water passing through the valve body inlets 120 into a cylinder cavity 155 downstream of the valve body outlets 122 for subsequent pressurization of the fluid during a pressurizing stroke of the host pump assembly 142.

As previously described, the valve body 112 may further include a central discharge passage 144 to enable high-pressure fluid generated during the pressurization stroke of the pump assembly 142 to pass through the valve body 112 toward a high-pressure fluid output chamber 146 of the pump assembly 142. The central discharge passage 144 may extend from the upstream end 134 of the valve body 112 to the downstream end 136 of the valve body 112 along a central axis $A_3$ of the valve body 112. An upstream portion 148 of the internal passages 124 may extend generally perpendicular to the central axis $A_3$ of the valve body 112 and a downstream portion 150 of the internal passages may extend generally parallel to the central axis $A_3$ of the valve body 112. Moreover, the upstream portion 148 of each internal passage 124 may have an initial cross-sectional area that is greater than a terminal cross-sectional area of the downstream portion 150 of the internal passage 124.

As shown in FIGS. 3 and 4, the valve body 112 may be coupled between or among components of the host pump assembly 142 to assist in routing fluid therethrough. Specifically, the valve body 112 may be coupled between an end cap 152 and a cylinder 154 of the pump assembly 142 and compressed therebetween via tie rods 156 or other devices. An inlet chamber 158 may be provided between the end cap 152 and the cylinder 154 with the inlet chamber 158 being in fluid communication with an inlet port 160 of the pump assembly 142 and the external fluid source 140 which is configured to supply fluid (e.g., water) to the pump assembly 142 during operation. The inlet chamber 158 may surround the perimeter of the valve body 112 such that each of the valve body inlets 120 is in simultaneous fluid communication therewith. In this manner, fluid can be supplied from the external fluid source 140 through the inlet port 160 into the inlet chamber 158 and through the internal passages 124 of the valve body 112 during operation.

With reference to FIG. 4, the valve body 112 may include one or more seal devices to form a fluid tight seal with surrounding components of the pump assembly 142. For example, a portion of the valve body may include a convex region 162 for engaging a tapered surface 164 of the cylinder 154 in a direct metal-to-metal sealing arrangement. As another example, the valve body 112 may include a groove 166 around its periphery to receive an o-ring 168 or other seal device for sealing engagement with a portion of the end cap 152. As yet another example, the valve body 112 may include a reduced neck portion 170 that is sized to receive an annular seal device 172 for sealing engagement with another portion of the end cap 152. In this manner, the valve body 112 and associated seal devices may interact with the surrounding structures of the pump assembly 142 (e.g., end cap 152, cylinder 154) to form a generally fluid tight inlet chamber 158 with the internal passages 124 of the valve body 112 serving as the only appreciable route for fluid to move downstream for subsequent pressurization and use.

Figure 5:
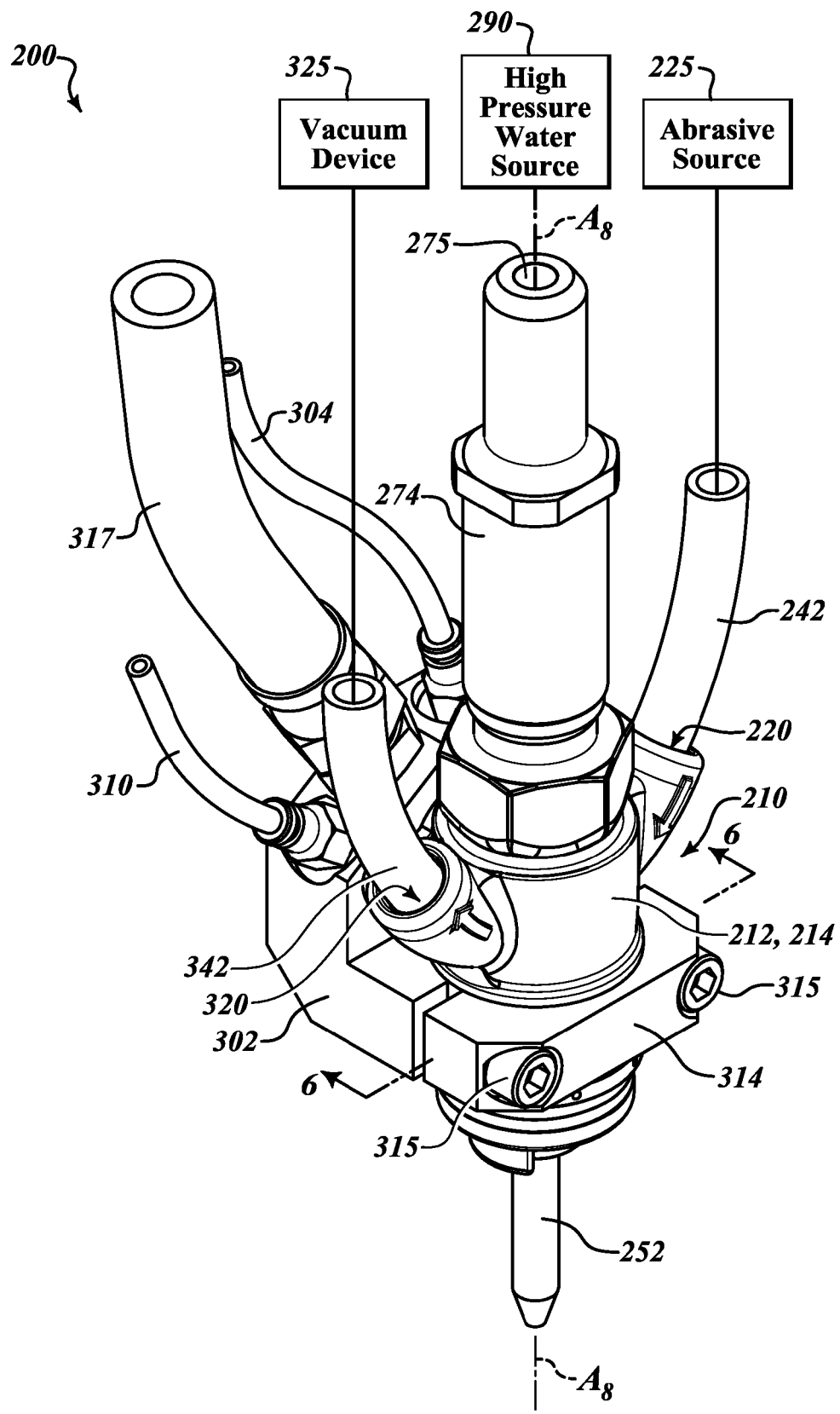
FIG. 5 is an isometric view of an abrasive waterjet cutting head assembly including a fluid distribution component, according to one embodiment, in the form of a cutting head body.
Figure 6:
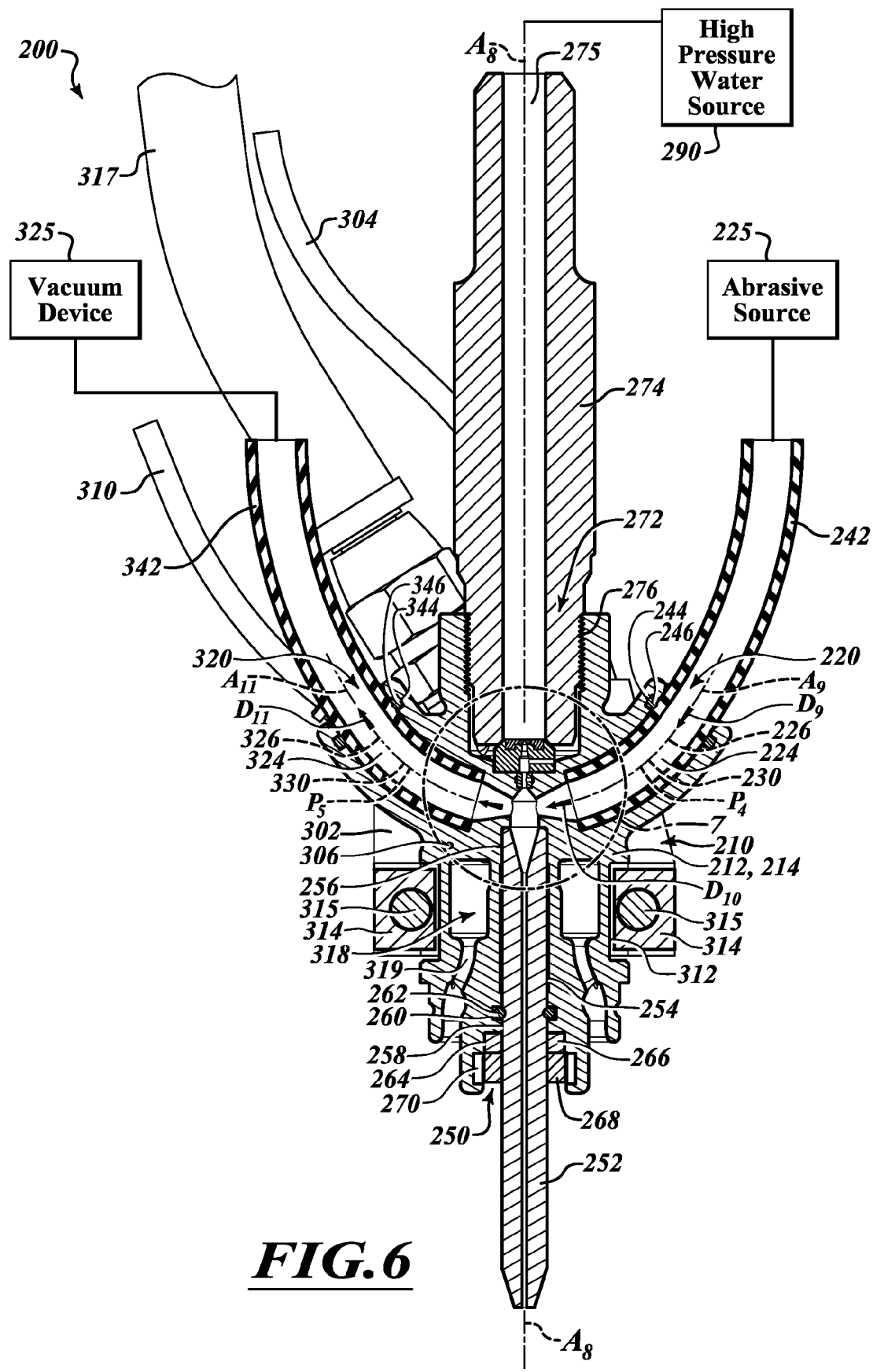
FIG. 6 is an elevational cross-sectional view of the abrasive waterjet cutting head assembly of FIG. 5 taken along line 6-6 of FIG. 5.
Figure 7:
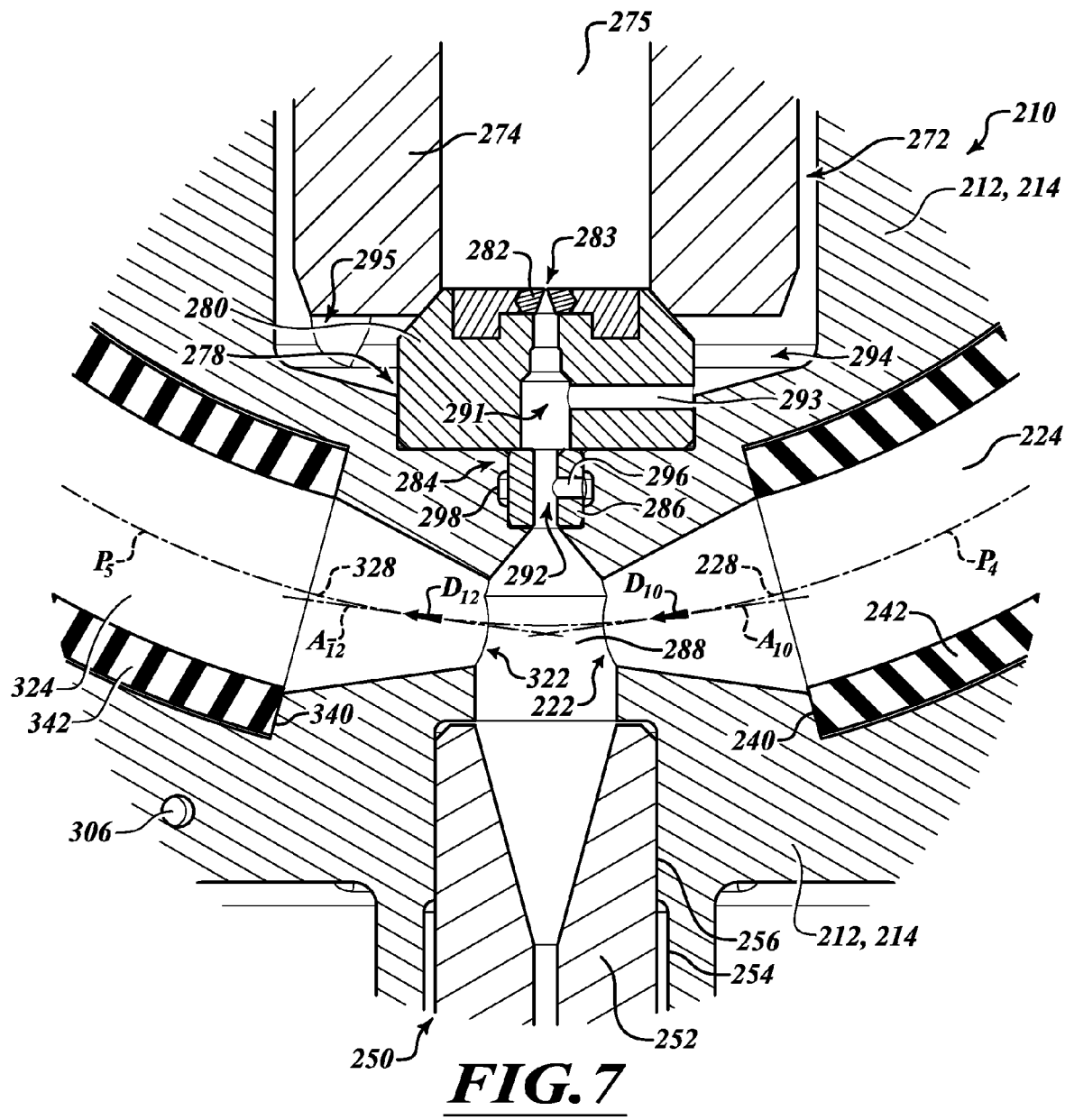
FIG. 7 is an enlarged detail view of a portion of the abrasive waterjet cutting head assembly of FIG. 5.
Figure 8:
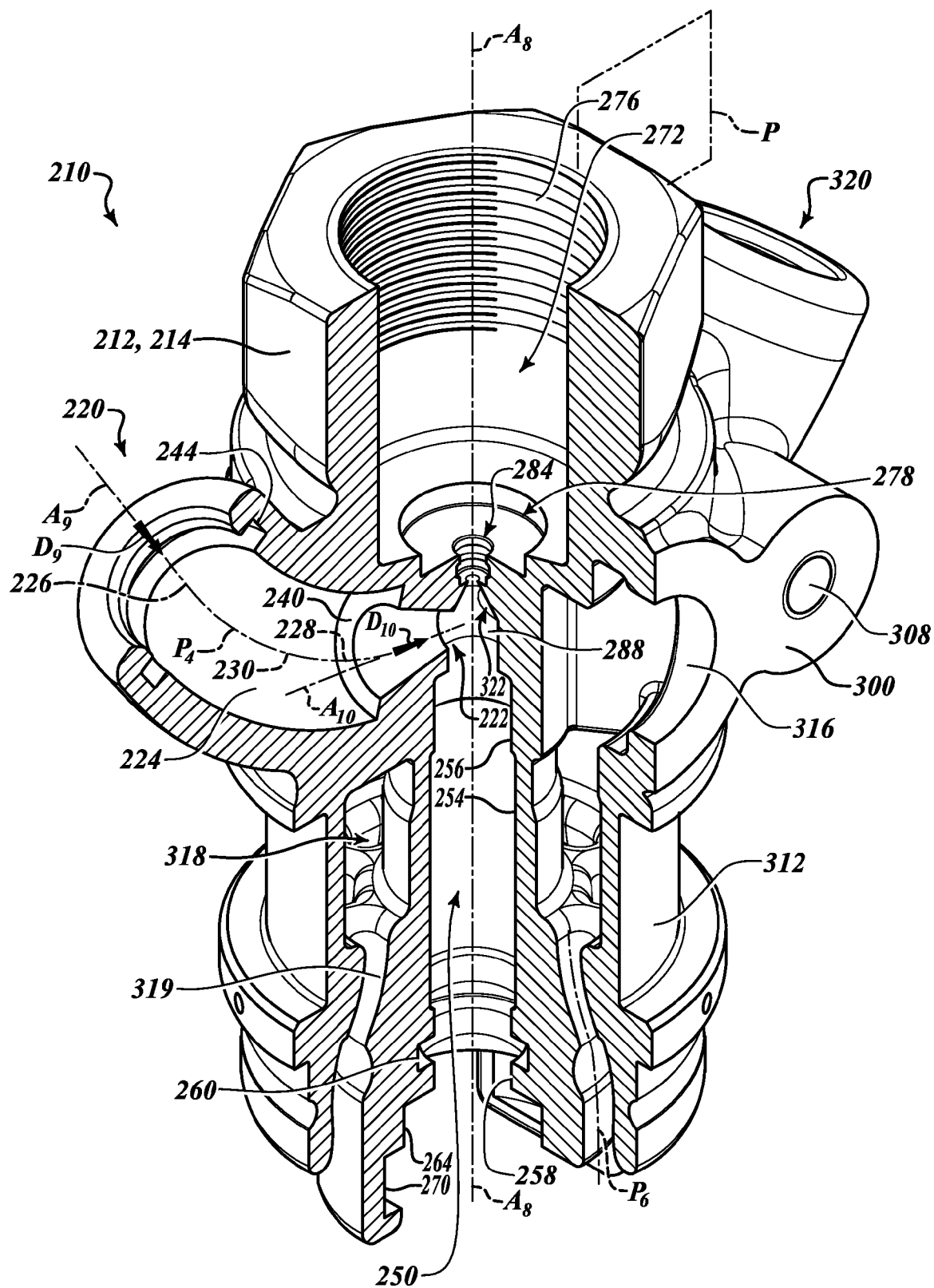
FIG. 8 is an isometric sectional view of the cutting head body of the abrasive waterjet cutting head assembly of FIG. 5.

FIGS. 5 through 7 show a cutting head assembly 200 having a fluid distribution component 210 in the form of a cutting head body 212 which is particularly well adapted to redirect matter (e.g., abrasive media) traveling in an inlet direction, indicated by the arrow labeled $D_9$ (FIG. 6), to an outlet direction, indicated by the arrow labeled $D_{10}$. The example cutting head body 212 has a unitary body 214 formed from an additive manufacturing or casting process using a material with material property characteristics (e.g., strength) suitable for high-pressure operating conditions. For instance, in some embodiments, the cutting head body 212 may be formed by a direct metal laser sintering process using 15-5 stainless steel material. In addition, the cutting head body 212 may undergo heat treatment or other manufacturing processes to alter the physical properties of the cutting head body 212, such as, for example, increasing the hardness of the cutting head body 212. Additional details of the cutting head body 212 are shown in FIG. 8 wherein the cutting head body 212 is shown isolated from other components of the cutting head assembly 200 of FIGS. 5 through 7.

With reference to FIGS. 5 through 8, the unitary body 214 of the cutting head body 212 is formed to include an abrasive media inlet 220, an abrasive media outlet 222 and an internal passage 224 extending between the abrasive media inlet 220 and the abrasive media outlet 222 to route abrasive media therethrough. The internal passage 224 extends through the cutting head body 212 along a path $P_4$ that is at least partially curvilinear. The abrasive media inlet 220 and the abrasive media outlet 222 each define a central axis $A_9$, $A_{10}$ and one end 226 of the path $P_4$ is generally aligned with the central axis $A_9$ of the abrasive media inlet 220 while the other end 228 of the path $P_4$ is generally aligned with the central axis $A_{10}$ of the abrasive media outlet 222. An intermediate portion 230 of the path $P_4$ between the end portions 226, 228 is curvilinear and shaped such that the internal passage 224 is configured to gradually redirect flow through the cutting head body 212 from the inlet direction $D_9$ generally aligned with the central axis $A_9$ of the abrasive media inlet 220 to the outlet direction $D_{10}$ generally aligned with the central axis $A_{10}$ of the abrasive media outlet 222. More particularly, the path $P_4$ of the internal passage 224 of the example cutting head body 212 includes at least an intermediate portion 230 that has an arcuate trajectory with a substantially constant radius of curvature. In addition, the path $P_4$ of the internal passage 224 may lay within a plane P (FIG. 8) containing central axes $A_9$, $A_{10}$ of the abrasive media inlet 220 and the abrasive media outlet 222. In other embodiments, however, the path $P_4$ of the internal passage 224 may be a three dimensional path and/or the intermediate portion 230 thereof may have a radius of curvature that varies over a length thereof.

Although a majority of the internal passage 224 of the example embodiment is shown as including a generally constant cross-sectional profile, it is appreciated that in other embodiments, the internal passage 224 that extends through the unitary body 214 may have a cross-sectional profile that varies over a length of the path $P_4$. For example, in some embodiments the cross-sectional profile may gradually narrow over a length of the path $P_4$ in a downstream direction (i.e., toward the abrasive media outlet 222). The cross-sectional profile of the passage 224 may vary in size, such as, for example, a circular cross-sectional profile that increases or decreases in diameter over a portion thereof and/or may vary in shape, such as, for example, a circular cross-sectional profile that transitions to an oval or other regular or irregularly shaped profile. In some embodiments, the size and/or shape of the cross-sectional profile may vary gradually over a portion of the internal passage 224. In addition, the internal passage 224 may intersect gradually with other passages to avoid sharp corners or other features that may be disruptive to flow through the cutting head body 212.

Moreover, the internal passage 224 may include one or more steps or shoulder portions to act as a stop for mating components. For instance, the internal passage 224 of the example cutting head body 212 includes a shoulder 240 which acts as a stop for an abrasive feed conduit 242 that interfaces with the internal passage 224 to supply abrasive media to the cutting head assembly 200. The shoulder 240 may be sized such that an internal diameter of the abrasive feed conduit 242 is generally coextensive with a portion of the internal passage 224 immediately downstream of the shoulder 240. The internal passage 224 may also include other features such as a groove 244 for receiving a seal device in the form of an o-ring 246 to engage the abrasive feed conduit 242 when the conduit 242 is installed in the internal passage 224.

In a related manner, the unitary body 214 of the cutting head body 212 may be formed to include an abrasive media assist inlet 320, an abrasive media assist outlet 322 and an internal passage 324 extending between the abrasive media assist inlet 320 and the abrasive media assist outlet 322 to assist in drawing abrasive media from an abrasive source 225 into the cutting head assembly 200 with the assistance of a vacuum device 325. The internal passage 324 may extend through the cutting head body 212 along a path $P_5$ that is at least partially curvilinear. The abrasive media assist inlet 320 and the abrasive media assist outlet 322 may each define a central axis $A_{11}$, $A_{12}$ and one end 326 of the path $P_5$ may be generally aligned with the central axis $A_{11}$ of the abrasive media assist inlet 320 while the other end 328 of the path $P_5$ may be generally aligned with the central axis $A_{12}$ of the abrasive media assist outlet 322. An intermediate portion 330 of the path $P_5$ between the end portions 326, 328 may be curvilinear and shaped such that the internal passage 324 is configured to gradually redirect flow through the cutting head body 212 from the direction $D_{12}$ generally aligned with the central axis $A_{12}$ of the abrasive media assist outlet 322 to a direction $D_{11}$ generally aligned with the central axis $A_{11}$ of the abrasive media assist inlet 320. More particularly, the path $P_5$ of the internal passage 324 of the example cutting head body 212 includes at least an intermediate portion 330 that has an arcuate trajectory with a substantially constant radius of curvature. In addition, the path $P_5$ of the internal passage 324 that extends through cutting head body 212 may lie within the same plane P as that of path $P_4$ of the abrasive inlet passage 224. In other embodiments, however, the path $P_5$ of the internal passage 324 may be a three dimensional path and/or the intermediate portion 330 thereof may have a radius of curvature that varies over a length of the path.

Although the majority of the internal passage 324 of the example embodiment is shown as including a generally constant cross-sectional profile, it is appreciated that in other embodiments, the internal passage 324 that extends through the unitary body 214 may have a cross-sectional profile that varies over a length of the path $P_5$. For example, in some embodiments the cross-sectional profile may gradually narrow over a length of the path $P_5$ in an upstream or downstream direction. The cross-sectional profile of the passage 324 may vary in size, such as, for example, a circular cross-sectional profile that increases or decreases in diameter over a portion thereof and/or may vary in shape, such as, for example, a circular cross-sectional profile that transitions to an oval or other regular or irregularly shaped profile. In some embodiments, the size and/or shape of the cross-sectional profile may vary gradually over a portion of the internal passage 324. In addition, the internal passage 324 may intersect gradually with other passages to avoid sharp corners or other features that may be disruptive to flow through the cutting head body 212.

Moreover, the internal passage 324 may include one or more steps or shoulder portions to act as a stop for mating components. For instance, the internal passage 324 of the example cutting head body 212 includes a shoulder 340 which acts as a stop for a vacuum conduit 342 that interfaces with the internal passage 324 to assist in drawing abrasive media into the cutting head assembly 200. The vacuum conduit 342 may be coupled to a vacuum device 325 for this purpose. The shoulder 340 may be sized such that an internal diameter of the vacuum conduit 342 is generally coextensive with a portion of the internal passage 324 immediately downstream of the shoulder 340. The internal passage 324 may also include other features such as a groove 344 for receiving a seal device in the form of an o-ring 346 to engage the vacuum conduit 342 when the conduit 342 is installed in the internal passage 324.

As shown in FIGS. 5 through 7, the cutting head body 212 may be coupled to adjacent components of the cutting head assembly 200 to form an efficient system for generating and discharging an abrasive waterjet therefrom for cutting or otherwise processing workpieces or work surfaces. For example, the cutting head body 212 may include an elongated central cavity 250 that is sized and shaped to insertably receive a nozzle or mixing tube 252. The central cavity 250 may include an offset or stepped portion 254 along a central part thereof to reduce the contact area between the mixing tube 252 and the cutting head body 212 when coupled thereto. In this manner, the mixing tube 252 may contact the cutting head body 212 at offset locations 256, 258. The cutting head body 212 may further include a circumferential groove 260 to receive an o-ring 262 or similar device to assist in coupling the mixing tube 252 within the central cavity 250 of the cutting head body 212.

Still further, one or more additional offset or stepped regions, enlarged cavity regions or other features may be provided at a downstream end of the central cavity 250 to accommodate devices for retaining the mixing tube 252 within the central cavity of the cutting head body 212. For example, a cavity 264 may be provided for accommodating a magnetic device 266 that is provided to attract a collar 268 rigidly fixed to the mixing tube 252. Once installed, the mixing tube 252 may be rotated about the central axis $A_8$ of the cutting head assembly 200 such that the collar 268 engages a locking feature 270 formed in the end of the cutting head body 212. In this manner, the cutting head body 212 is particularly well suited to removably receive the nozzle or mixing tube 252 and enable quick replacement of the same.

As another example, and with reference to FIGS. 6 through 8, the cutting head body 212 may include another elongated central cavity 272 that is sized and shaped to removably receive a nozzle body 274. For this purpose, the central cavity 272 may include internal threads 276 to mate with corresponding external threads of the nozzle body 274. An orifice mount receiving cavity 278 may also be formed in a downstream end of the elongated central cavity 272 to removably receive an orifice mount 280, as best shown in FIG. 7, which includes an orifice 282 (e.g., jewel orifice) supported thereby for generating a high-pressure fluid jet as high-pressure fluid passes through an opening 283 in the orifice 282. In addition, an insert or restrictor cavity 284 may be provided downstream of the orifice mount receiving cavity 278 to receive an insert or restrictor 286, which may be configured to alter a fluid jet exiting the orifice 282 of the orifice mount 280 prior to entering a mixing chamber 288 formed integrally in the unitary body 214 of the cutting head body 212. The mixing chamber 288 is located between the orifice mount receiving cavity 278 and the central cavity 250 that is configured to receive the nozzle or mixing tube 252 such that abrasive media may be fed into the fluid jet exiting the orifice 282 of the orifice mount 280 prior to entering the nozzle or mixing tube 252. As shown in FIGS. 6 through 8, the mixing chamber 288 may be tapered at an upstream portion to converge toward an outlet of the insert or restrictor 286. The mixing chamber 288 also intersects with the internal passage 224 described above to receive abrasive media from the abrasive media source 225 and with the internal passage 324 to assist in drawing abrasive media into the mixing chamber 288. Unutilized abrasive media may also be discharged through the internal passage 324 to be discarded, recycled or reused in subsequent processing operations.

During operation, and with reference in particular to FIGS. 6 and 7, high-pressure water is selectively supplied from a high pressure water source 290 to the nozzle body 274. The high-pressure water travels through a passage 275 in the nozzle body 274 toward the orifice 282 supported in the orifice mount 280, which is compressed between the nozzle body 274 and the orifice mount receiving cavity 278 of the cutting head body 212. As the high-pressure water passes through the orifice 282, a fluid jet is generated and discharged downstream through a jet passageway 291 in the orifice mount 282. The jet continues through a jet passage 292 of the insert or restrictor 286 and the mixing chamber 288 wherein abrasives may be entrained in the jet to form an abrasive waterjet prior to entering the nozzle or mixing tube 252. The abrasives and water mixture may continue to mix as the abrasive waterjet travels along the length of the nozzle or mixing tube 252. Ultimately, the abrasive waterjet is discharged through the downstream end of the nozzle or mixing tube 252 onto a workpiece or work surface to be cut or processed in a desired manner.

Additional features may be provided along the flow path of the waterjet to condition or otherwise alter the jet prior to discharge. For example, the orifice mount 280 may include a vent 293 which opens up into a chamber 294 that may be formed between walls of the central cavity 272 of the cutting head body 212, an end of the nozzle body 274 and the orifice mount 280. The chamber 294 may be vented to the external environment via a passageway 295 integrally formed in the unitary body 214 of the cutting head body 212 between the chamber 294 and outer surface of the cutting head body 212. As another example, the insert or restrictor 286 may include a passage 296 which is in communication with a supplemental chamber 298 formed between the insert or restrictor 286 and the cutting head body 212. A supplemental passageway (not visible) may be formed in the cutting head body 212 to connect the supplemental chamber 298 to a supplemental port (cut-away in FIG. 8) located on an outer face 300 (FIG. 8) of the cutting head body 212. A manifold 302 may be provided and coupled to the cutting head body 212 and a conduit 304 to feed fluid (e.g., water, gas, etc.) into the path of the waterjet through the passage 296 in the insert or restrictor 286 to condition or otherwise alter the fluid jet. Alternatively, the waterjet may be vented to atmosphere through the passage 296 in the insert or restrictor 286 or a vacuum may be applied to the passage 296 in the insert or restrictor 286 to alter the waterjet passing therethrough. In still other embodiments, the insert or restrictor 286 may be coupled to a sensor (e.g., pressure sensor) via the passage 296 to monitor a condition of the fluid jet.

Additionally, one or more internal passages may be provided within the unitary body 214 of the cutting head body 212 to provide flushing or other functionality. For example, another supplemental passageway 306 (partially visible in FIGS. 6 and 7) may be formed in the cutting head body 212 between the abrasive media assist outlet 322 and another supplemental port 308 (FIG. 8) located on the outer face 300 of the cutting head body 212. The manifold 302 may be provided and coupled to the cutting head body 212 to bring the supplemental port 308 into fluid communication with another conduit 310 to feed fluid (e.g., water, gas, etc.) into the passage 324 of the vacuum assist portion of the cutting head body 212 to periodically flush the passage 324. As shown best in FIG. 5, the manifold 302 may be coupled around a reduced section 312 of the cutting head body 212 and fastened thereto with a mounting block 314, fasteners 315, clamps or other attachment devices.

The manifold 302 may be coupled to the cutting head body 212 to bring yet another supplemental port 316 (shown in FIG. 8) into fluid communication with another conduit 317 to feed fluid (e.g., water, gas, etc.) into the cutting head body 212 to be selectively discharged as a shield or shroud around the nozzle or mixing tube 252 of the cutting head assembly 200 during operation. More particularly, fluid may be fed through the supplemental port 316 into a shroud chamber 318 within the unitary 214 body of the cutting head body 212. The shroud chamber 318 may be in fluid communication with the environment external to the cutting head body 212 via a plurality of shroud passages 319 leading toward a downstream end of the cutting head body 212. The shroud passages 319 may be spaced in intervals about the central axis $A_8$ of the cutting head body 212. The passages 319 may follow respective paths $P_6$ that include at least a curvilinear portion. In addition, a cross-sectional profile of the paths $P_6$ may vary along a length thereof. The shroud passages 319 may be densely packed or otherwise arranged to provide a generally cylindrical shroud of discharged fluid around the nozzle or mixing tube 252 of the cutting head assembly 200 during operation. The shroud may be, for example, a water curtain that is discharged from the shroud passages 319 to assist in shielding rebounding contents of the fluid jet from damaging components of the cutting head assembly 200, the workpiece being processed or other structures in the vicinity of the cutting head assembly 200 during operation.

Although the example cutting head assembly 200 of FIGS. 5 through 7 is shown as including a separate manifold 302 coupled to the cutting head body 212 in fluid communication with the supplemental ports 308, 316 described above, it is appreciated that the manifold 302 may be formed integrally with the unitary body 214 of the cutting head body 212 or may be omitted entirely with the conduits 304, 310, 317 coupled to the ports 308, 316 with appropriate fittings or adapters. In addition, it is appreciated that in some embodiments, the cutting head body 212 may not include the supplemental passages and features associated with conduits 304, 310 and 317.

Figure 9:
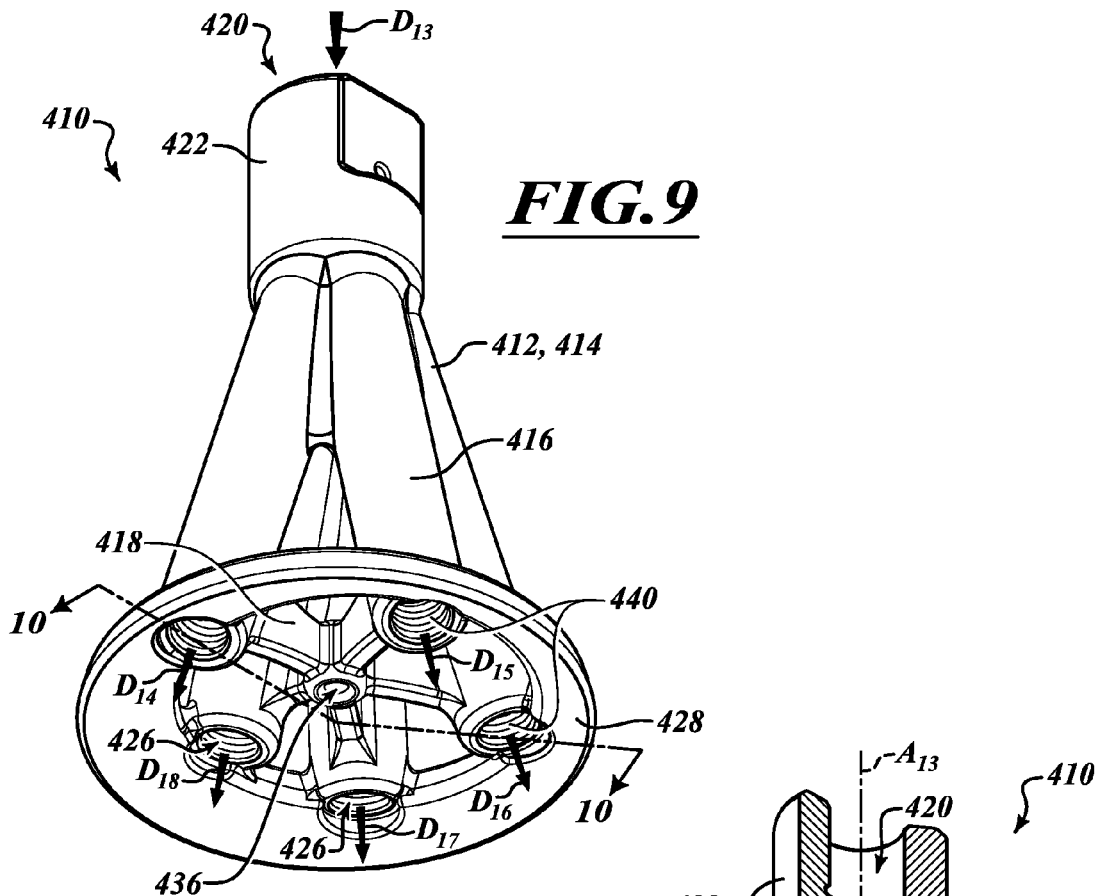
FIG. 9 is a perspective view of a fluid distribution component of a high-pressure waterjet system, according to one embodiment, in the form of a surface preparation nozzle.
Figure 10:
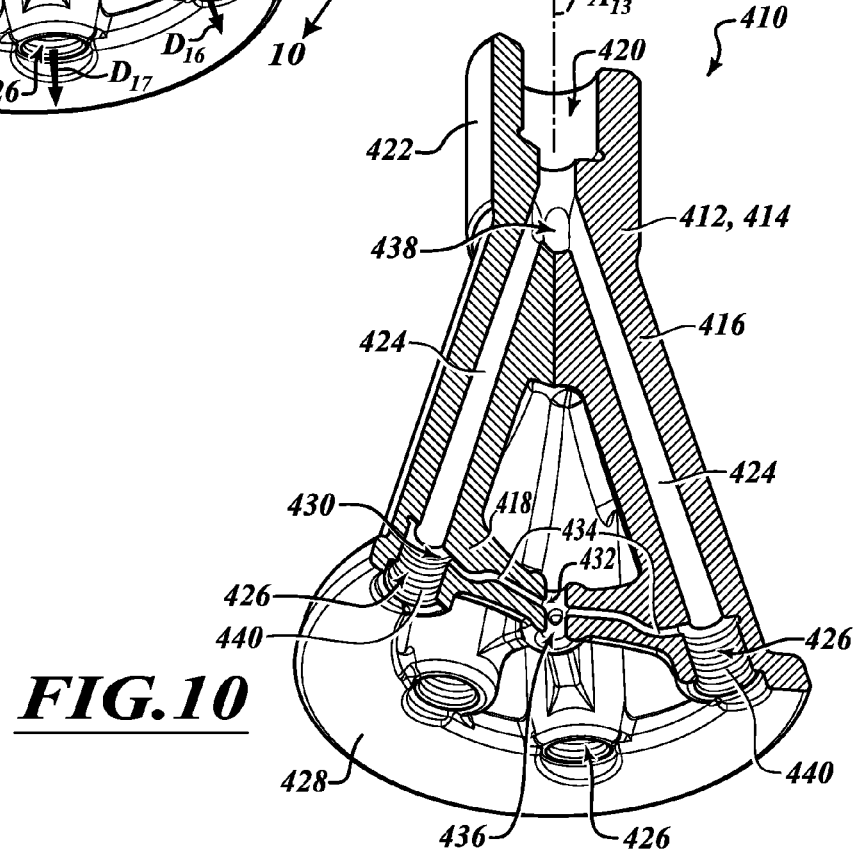
FIG. 10 is an perspective sectional view of the surface preparation nozzle of FIG. 9 taken along lines 10-10 of FIG. 9.

FIGS. 9 and 10 show one example of a fluid distribution component 410 in the form of a surface treatment nozzle 412 which is particularly well adapted to distribute high-pressure fluid (e.g., water) traveling in an inlet direction, indicated by the arrow labeled $D_{13}$, to a plurality of outlet directions, indicated by the arrows labeled $D_{14}$, $D_{15}$, $D_{16}$, $D_{17}$, $D_{18}$. The example surface treatment nozzle 412 has a unitary body 414 formed from an additive manufacturing or casting process using a material with material property characteristics (e.g., strength) suitable for high-pressure operating conditions. For instance, in some embodiments, the surface treatment nozzle 412 may be formed by a direct metal laser sintering process using 15-5 stainless steel material. In addition, the surface treatment nozzle 412 may undergo heat treatment or other manufacturing processes to alter the physical properties of the surface treatment nozzle 412, such as, for example, increasing the hardness of the surface treatment nozzle 412. Although the example surface treatment nozzle 412 is shown as a nozzle with five diverging legs 416 and bridge structures 418 integrally formed therebetween, it is appreciated that in other embodiments the surface treatment nozzle 412 may take on different forms, including, for example, a surface treatment nozzle having more or fewer than five diverging legs 416 or a surface treatment nozzle having a solid body construction with no distinguishable leg structures.

The surface treatment nozzle 412 has an inlet 420 at an upstream portion 422 thereof to receive a high-pressure flow of water or mixture of water and abrasives and a plurality of feed passages 424 in fluid communication therewith to distribute the received matter through each of the legs 416 which diverge away from a central axis $A_{13}$ of the nozzle 412 in a downstream direction. Each of the feed passages 424 includes a respective outlet 426 for discharging a portion of the flow onto a workpiece or work surface to be processed. The outlets 426 may be distributed among a downstream end portion 428 of the unitary body 414 of the surface treatment nozzle 412 which joins each of the legs 416 together. Distributing the outlets 426 in this manner provides a nozzle 412 which is particularly well suited for cleaning, preparing or otherwise processing large surface areas. The upstream portion 422 of the nozzle 412 may be configured to be removably coupled to a high-pressure waterjet or abrasive waterjet cutting head. In this manner, the surface preparation nozzle 412 may be interchangeably replaced with other nozzles of similar or different configurations to provide a versatile system that enables a user to select a nozzle particularly well suited for a given processing operation. In addition, each of the outlets 426 may be provided with internal threads or other coupling features for interchangeably receiving a respective nozzle (not shown), which may be used to modify the characteristics of the discharged flow.

With continued reference to FIGS. 9 and 10, the unitary body 414 of the surface treatment nozzle 412 is formed to include weep passages 434 extending between the feed passages 424 of the nozzle 412. Each weep passage 434 includes a respective inlet 430 and a respective outlet 432, with the weep passage 434 extending between the inlet 430 and the outlet 432 to enable fluid to weep from a downstream end of each feed passage 424 toward a central outlet region 436. Each weep passage 434 extends through the nozzle along a path, which may include at least a portion which is curvilinear. For example, the inlet 430 and the outlet 432 of each weep passage may define a central axis. One end of the path may be generally aligned with the central axis of the inlet 430, the other end of the path may be generally aligned with the central axis of the outlet 432 and an intermediate portion between the end portions may be curvilinear and shaped such that the weep passage 434 is configured to gradually redirect flow from a direction generally aligned with the central axis of the inlet 430 to a direction generally aligned with the central axis of the outlet 432. The path of each weep passage 434 that extends through the unitary body 414 may lie within a respective plane containing the central axes of the inlet 430 and the outlet 432. In other embodiments, however, the path of each internal weep passage 434 that extends through the unitary body 414 may be a three dimensional path.

Although the feed passages 424 and the weep passages 434 of the example embodiment are shown as including substantial portions with generally constant cross-sectional profiles, it is appreciated that in other embodiments the cross-sectional profiles may vary over corresponding lengths thereof. For example, in some embodiments the cross-sectional profile of the feed passages 424 may gradually narrow over a length of the passages 424 in a downstream direction. The cross-sectional profile of the feed passages 424 may vary in size, such as, for example, a circular cross-sectional profile that increases or decreases in diameter over a portion thereof and/or may vary in shape, such as, for example, a circular cross-sectional profile that transitions to an oval or other regular or irregularly shaped profile. In some embodiments, the size and shape of the cross-sectional profile may vary gradually over a portion of each internal feed passage 424. In addition, each internal passage 424 may intersect gradually with each other to avoid sharp corners or other features that may be disruptive to flow through the nozzle 412. The weep passages 434 may contain similar features.

FIGS. 11 and 12 show one example of a fluid distribution component 510 in the form of a nozzle body 512 which is particularly well adapted to distribute high-pressure fluid (e.g., water) traveling in an inlet direction, indicated by the arrow labeled $D_{19}$, to an outlet direction, indicated by the arrow labeled $D_{20}$, to be delivered to an orifice (not shown) downstream of the nozzle body 512. The nozzle body 512 may be utilized, for example, within the waterjet cutting head assembly 200 shown in FIGS. 5 through 7 as an alternative to nozzle body 274. For this purpose, the nozzle body 512 may include external threads 516 for mating with corresponding threads 276 (FIG. 6) of the cutting head body 212 and an engagement surface 518 for abutting the orifice mount 280 (FIG. 7) when the nozzle body 512 is installed for use.

The example nozzle body 512 has a unitary body 514 formed from an additive manufacturing or casting process using a material with material property characteristics (e.g., strength) suitable for high-pressure operating conditions. For instance, in some embodiments, the nozzle body 512 may be formed by a direct metal laser sintering process using 15-5 stainless steel material.

In addition, the nozzle body 512 may undergo heat treatment or other manufacturing processes to alter the physical properties of the nozzle body 512, such as, for example, increasing the hardness of the nozzle body 512. Although the example nozzle body 512 is shown as a generally elongated nozzle with a predominately circular cross-sectional outer profile, it is appreciated that in other embodiments the nozzle body 512 may vary in shape and form.

With continued reference to FIGS. 11 and 12, the unitary body 514 of the nozzle body 512 is formed to include a nozzle body inlet 520, a nozzle body outlet 522 and an internal passage 524 extending between the nozzle body inlet 520 and the nozzle body outlet 522 to route fluid therethrough. The internal passage 524 extends through the nozzle body 512 along a path $P_7$ that is at least partially curvilinear. The nozzle body inlet 520 and the nozzle body outlet 522 each define a central axis $A_{16}$, $A_{17}$ and one end 526 of the path $P_7$ is generally collinear with the central axis $A_{16}$ of the nozzle body inlet 520 while the other end 528 of the path $P_7$ is generally collinear with the central axis $A_{17}$ of the nozzle body outlet 522. An intermediate portion 530 of the path $P_7$ between the end portions 526, 528 is curvilinear and shaped such that the internal passage 524 is configured to spiral through the nozzle body 512 about the collinear axes $A_{16}$, $A_{17}$ of the nozzle body inlet 520 and the nozzle body outlet 522. More particularly, the path $P_7$ of the internal passage 524 of the example nozzle body 512 includes an intermediate portion 530 which spirals with approximately six revolutions over a length of the nozzle body 512 and with the spiral trajectory tightening or narrowing as it approaches a downstream end 540 of the nozzle body 512. The spiraling nature of the flow path $P_7$ may promote improved flow characteristics and enhanced mixing of the discharged flow with abrasives that may be subsequently entrained therewith.

Although the internal passage 524 of the example embodiment is shown as including an intermediate portion 530 with a generally constant cross-sectional profile, it is appreciated that in other embodiments, at least a portion of the internal passage 524 that extends through the unitary body 514 may have a cross-sectional profile that varies over a corresponding length of the path $P_7$. For example, in some embodiments the cross-sectional profile may gradually narrow over a length of the path $P_7$ in a downstream or upstream direction. The cross-sectional profile of the passage 524 may vary in size, such as, for example, a circular cross-sectional profile that increases or decreases in diameter over a portion thereof and/or may vary in shape, such as, for example, a circular cross-sectional profile that transitions to an oval or other regular or irregularly shaped profile. In some embodiments, the size and shape of the cross-sectional profile may vary gradually over a portion of the internal passage 524. In addition, although the internal passage 524 of the example embodiment is shown as including an intermediate portion that includes about six revolutions about the collinear axes $A_{16}$, $A_{17}$ of the nozzle body inlet 520 and nozzle body outlet 522, the passage 524 may include more or less revolutions. In addition, other three-dimensional paths may be provided in lieu of the illustrated tapering spiral path $P_7$.

In view of the above, it will be appreciated that a wide variety of fluid distribution components for high-pressure waterjet systems may be provided in accordance with the various described embodiments which are particularly well adapted for receiving a flow of high-pressure fluid or other matter (e.g., abrasive media) and routing said flow towards a cutting head assembly to cut or process a workpiece or work surface. The fluid distribution components may include complex passages (e.g., passages with curvilinear trajectories and/or varying cross-sectional shapes and/or sizes) that are well suited for routing fluid or other matter in particularly efficient and reliable form factors. Benefits of embodiments of such fluid distribution components include the ability to provide enhanced flow characteristics and/or to reduce of turbulence within the internal passages which are subjected to recurrent high-pressure operating conditions. This can be particularly advantageous when space constraints might not otherwise provide sufficient space for developing favorable flow characteristics. For example, a low profile nozzle system may be desired when cutting workpieces within confined spaces. Including fluid distribution components with internal passages as described herein can enable such low profile nozzle systems to generate a fluid jet with desired jet characteristics despite such space constraints. Other benefits include reducing the pressure drop across the fluid distribution components relative to similar components formed according to known methods, which typically include straight, cross-drilled holes and intersecting passageways with sharp edges or other features. In addition, the fatigue life of such fluid distribution components may be extended by eliminating sharp corners, abrupt transitions and other stress concentrating features. These and other benefits may be provided by the various embodiments described herein.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:
1. A high-pressure fluid jet system comprising:
a pump to selectively provide a source of high-pressure fluid at an operating pressure of at least 20,000 psi;
an end effector assembly configured to receive the high-pressure fluid and generate a high-pressure fluid jet for processing a workpiece or work surface; and
a fluid distribution system in fluid communication with the pump and the end effector assembly to route the high-pressure fluid from the pump to the end effector assembly, and
wherein at least one of the pump, the end effector assembly and the fluid distribution system comprises:
a fluid distribution component in the form of an elbow fitting having a unitary body formed from an additive manufacturing or casting process, the unitary body comprising perpendicular leg portions, an inlet, an outlet and an internal passage between the inlet and the outlet to assist in routing matter through the high-pressure fluid jet system, the internal passage having a path that is at least partially curvilinear and the fluid distribution component being subjected to cyclic or periodic loading during operation of the system arising from recurrent high-pressure conditions corresponding to the operating pressure of at least 20,000 psi,
wherein the elbow fitting includes a coupling device at each of the inlet and the outlet to couple to other components of the fluid distribution system and each of the inlet and the outlet includes a frustoconical engagement surface to mate with a respective adjacent component of the fluid distribution system;

wherein the inlet and the outlet each define a central axis, wherein the internal passage extends through the unitary body along the path, a first end portion of the path being generally collinear with the central axis of the inlet and a second end portion of the path being generally collinear with the central axis of the outlet, and wherein an intermediate portion of the path of the internal passage includes a first portion with a first radius of curvature and a second portion with a second radius of curvature, an origin of the first radius of curvature and an origin of the second radius of curvature being located on opposite sides of the path.

2. The high-pressure fluid jet system of claim 1 wherein the internal passage is configured to gradually redirect a flow of matter from an inlet direction along the central axis of the inlet to an outlet direction along the central axis of the outlet.

3. The high-pressure fluid jet system of claim 1 wherein the path of the internal passage that extends through the unitary body lies within a plane defined by the central axes of the inlet and the outlet.

4. The high-pressure fluid jet system of claim 1 wherein the path of the internal passage that extends through the unitary body is a three dimensional path.

5. The high-pressure fluid jet system of claim 1 wherein at least a portion of the internal passage that extends through the unitary body has a cross-sectional profile that varies over a corresponding length of the path.

6. The high-pressure fluid jet system of claim 5 wherein the cross-sectional profile gradually narrows over the corresponding length of the path in a downstream direction.

7. The high-pressure fluid jet system of claim 1 wherein a portion of the path of the internal passage of the fluid distribution component has a radius of curvature that is substantially constant.

8. A high-pressure fluid jet system comprising:

a pump to selectively provide a source of high-pressure fluid at an operating pressure of at least 20,000 psi;

an end effector assembly configured to receive the high-pressure fluid and generate a high-pressure fluid jet for processing a workpiece or work surface; and a fluid distribution system in fluid communication with the pump and the end effector assembly to route the high-pressure fluid from the pump to the end effector assembly, and wherein at least one of the pump, the end effector assembly and the fluid distribution system comprises:

a fluid distribution component in the form of a fitting having a unitary body formed from an additive manufacturing or casting process, the unitary body comprising an inlet, an outlet and an internal passage between the inlet and the outlet to assist in routing matter through the high-pressure fluid jet system, the internal passage having a path that is at least partially curvilinear and the fluid distribution component being subjected to cyclic or periodic loading during operation of the system arising from recurrent high-pressure conditions corresponding to the operating pressure of at least 20,000 psi, wherein the fitting includes a coupling device at each of the inlet and the outlet to couple to other components of the fluid distribution system, wherein the inlet and the outlet each define a central axis, wherein the internal passage extends through the unitary body along the path, a first end portion of the path being generally collinear with the central axis of the inlet and a second end portion of the path being generally collinear with the central axis of the outlet, and wherein an intermediate portion of the path of the internal passage includes a first portion with a first radius of curvature and a second portion with a second radius of curvature, an origin of the first radius of curvature and an origin of the second radius of curvature being located on opposite sides of the path.

9. The high-pressure fluid jet system of claim 8 wherein the fitting is an elbow fitting, and wherein each of the inlet and the outlet include a frustoconical engagement surface to mate with a respective adjacent component of the fluid distribution system.

10. A fluid distribution component of a high-pressure fluid jet system that includes an end effector assembly configured to receive high-pressure fluid from a pump and generate a high-pressure fluid jet for processing a workpiece or work surface, the fluid distribution component comprising:

a fitting having a unitary body formed from an additive manufacturing or casting process, the unitary body comprising:

perpendicular leg portions;

an inlet;

an outlet;

an internal passage between the inlet and the outlet to assist in routing matter through the high-pressure fluid jet system, the internal passage having a path that is at least partially curvilinear and the fluid distribution component being subjected to cyclic or periodic loading during operation of the system arising from recurrent high-pressure conditions corresponding to an operation pressure of at least 20,000 psi;

a coupling device provided at each of the inlet and the outlet to couple to other components of the fluid distribution system;

a respective frustoconical engagement surface at each of the inlet and the outlet to mate with a respective adjacent component of the fluid distribution system; and wherein the inlet and the outlet each define a central axis, wherein the internal passage extends through the unitary body along the path, a first end portion of the path being generally aligned with the central axis of the inlet and a second end portion of the path being generally aligned with the central axis of the outlet, and wherein an intermediate portion of the path of the internal passage includes a first portion with a first radius of curvature and a second portion with a second radius of curvature, an origin of the first radius of curvature and an origin of the second radius of curvature being located on opposite sides of the path.

11. The fluid distribution component of claim 10 wherein the internal passage is configured to gradually redirect a flow of matter from an inlet direction along the central axis of the inlet to an outlet direction along the central axis of the outlet.

12. The fluid distribution component of claim 10 wherein the path of the internal passage that extends through the unitary body lies within a plane defined by the central axes of the inlet and the outlet.

13. The fluid distribution component of claim 10 wherein the path of the internal passage that extends through the unitary body is a three dimensional path.

14. The fluid distribution component of claim 10 wherein at least a portion of the internal passage that extends through the unitary body has a cross-sectional profile that varies over a corresponding length of the path.

15. The fluid distribution component of claim 14 wherein the cross-sectional profile gradually narrows over the corresponding length of the path in a downstream direction.

16. The fluid distribution component of claim 10 wherein a portion of the path of the internal passage of the fluid distribution component has a radius of curvature that is substantially constant.

17. The fluid distribution component of claim 10 wherein the fitting is a tee-fitting, a branch fitting or an elbow fitting.

18. A fluid distribution component of a high-pressure fluid jet system that includes an end effector assembly configured to receive high-pressure fluid from a pump and generate a high-pressure fluid jet for processing a workpiece or work surface, the fluid distribution component comprising:
- a fitting having a unitary body formed from an additive manufacturing or casting process, the unitary body comprising:
  - an inlet;
  - an outlet;
  - an internal passage between the inlet and the outlet to assist in routing matter through the high-pressure fluid jet system, the internal passage having a path that is at least partially curvilinear and the fluid distribution component being subjected to cyclic or periodic loading during operation of the system arising from recurrent high-pressure conditions corresponding to an operation pressure of at least 20,000 psi; and
- a coupling device provided at each of the inlet and the outlet to couple to other components of the fluid distribution system, wherein the inlet and the outlet each define a central axis, wherein the internal passage extends through the unitary body along the path, a first end portion of the path being generally collinear with the central axis of the inlet and a second end portion of the path being generally collinear with the central axis of the outlet, and wherein an intermediate portion of the path of the internal passage includes a first portion with a first radius of curvature and a second portion with a second radius of curvature, an origin of the first radius of curvature and an origin of the second radius of curvature being located on opposite sides of the path.

19. The fluid distribution component of claim 18 wherein the unitary body of the fitting further comprises a respective frustoconical engagement surface at each of the inlet and the outlet to mate with a respective adjacent component of the fluid distribution system.

* * * * *